(12) United States Patent
Yasuda

(10) Patent No.: US 10,151,864 B2
(45) Date of Patent: Dec. 11, 2018

(54) OPTICAL FILM, ILLUMINATION DEVICE, AND IMAGE DISPLAY DEVICE

(71) Applicant: FUJIFILM Corporation, Tokyo (JP)

(72) Inventor: Kotaro Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

(21) Appl. No.: 15/433,779

(22) Filed: Feb. 15, 2017

(65) Prior Publication Data

US 2017/0160452 A1 Jun. 8, 2017

Related U.S. Application Data

(63) Continuation of application No. PCT/JP2015/076281, filed on Sep. 16, 2015.

(30) Foreign Application Priority Data

Sep. 19, 2014 (JP) ................................ 2014-191152

(51) Int. Cl.
| | |
|---|---|
| *G02F 1/133* | (2006.01) |
| *G02B 5/30* | (2006.01) |
| *G02B 5/26* | (2006.01) |
| *G02F 1/1335* | (2006.01) |
| *G02F 1/13363* | (2006.01) |

(52) U.S. Cl.
CPC ............ *G02B 5/3066* (2013.01); *G02B 5/26* (2013.01); *G02B 5/3083* (2013.01); *G02F 1/133528* (2013.01); *G02F 1/133536* (2013.01); *G02F 1/133634* (2013.01); *G02F 1/13362* (2013.01); *G02F 1/133606* (2013.01); *G02F 2001/133541* (2013.01); *G02F 2413/11* (2013.01); *G02F 2413/13* (2013.01)

(58) Field of Classification Search
None
See application file for complete search history.

(56) References Cited

U.S. PATENT DOCUMENTS

| | | |
|---|---|---|
| 6,888,599 B2 | 5/2005 | Kawamoto et al. |
| 8,531,765 B2 | 9/2013 | Sakai et al. |

(Continued)

FOREIGN PATENT DOCUMENTS

| | | |
|---|---|---|
| JP | 2003-195038 A | 7/2003 |
| JP | 2003-222725 A | 8/2003 |

(Continued)

OTHER PUBLICATIONS

Notification of Reasons for Refusal issued by the Japanese Patent Office dated Feb. 6, 2018, in connection with Japanese Patent Application No. 2016-548909.

(Continued)

*Primary Examiner* — James Dudek
(74) *Attorney, Agent, or Firm* — Edwards Neils LLC; Jean C. Edwards, Esq.

(57) ABSTRACT

An optical film having a positive C-plate sandwiched by circular polarization reflection layers with different center wavelength of reflection band, wherein the circular polarization reflection layer closest to a light exit side of the optical film does not have the shortest center wavelength of reflection band among the circular polarization reflection layers, can suppress an oblique tint change when the optical film is incorporated into a liquid crystal display device.

15 Claims, 3 Drawing Sheets

(56) References Cited

U.S. PATENT DOCUMENTS

| | | |
|---|---|---|
| 2004/0189908 A1 | 9/2004 | Kawamoto et al. |
| 2007/0008460 A1* | 1/2007 | Takeda ............... G02F 1/13362 |
| | | 349/98 |
| 2011/0222155 A1 | 9/2011 | Sakai et al. |

FOREIGN PATENT DOCUMENTS

| | | |
|---|---|---|
| JP | 2003-279739 A | 10/2003 |
| JP | 2003-294948 A | 10/2003 |
| JP | 2004-144943 A | 5/2004 |
| JP | 2005-308988 A | 11/2005 |
| JP | 2007-286141 A | 11/2007 |
| JP | 2008-250333 A | 10/2008 |
| JP | 2012-032418 A | 2/2012 |

OTHER PUBLICATIONS

International Preliminary Report on Patentability issued by WIPO dated Mar. 30, 2017, in connection with international Patent Application No. PCT/JP2015/076281.
International Search Report issued in connection with International Patent Application No. PCT/JP2015/076281 dated Dec. 22, 2015.
Written Opinion issued in connection with International Patent Application No. PCT/JP2015/076281 dated Dec. 22, 2015.

* cited by examiner

OPTICAL FILM, ILLUMINATION DEVICE, AND IMAGE DISPLAY DEVICE

CROSS-REFERENCE TO RELATED APPLICATIONS

This application is a Continuation of PCT International Application No. PCT/JP2015/076281, filed on Sep. 16, 2015, which was published under PCT Article 21(2) in Japanese and which claims priority under 35 U.S.C. Section 119(a) to Japanese Patent Application No. 2014-191152 filed on Sep. 19, 2014. The above applications are hereby expressly incorporated by reference, in their entirety, into the present application.

BACKGROUND OF THE INVENTION

1. Field of the Invention

The invention relates to an optical film, an illumination device, and an image display device. Specifically, an optical film that can suppress an oblique tint change in a case where the optical film is incorporated into a liquid crystal display device, an illumination device using this optical film, and an image display device.

2. Description of the Related Art

A flat panel display such as a liquid crystal display device (hereinafter, also referred to as LCD) has small power consumption and the use thereof is widened year by year to a space saving image display device.

In a recent flat panel display market, development for power saving by performance improvement in both uses of a use for a large size mainly as a use for a TV and a use for a small size as a use for a tablet PC or a smart phone has progressed.

In order to cause light exit from the light source to be effectively incident on a liquid crystal cell or the like, a technique of improving luminance by collecting outgoing light in a front direction by a light collecting element such as a prism sheet has been suggested.

For example, JP2008-250333A discloses a light collecting element that does not have a pattern structure when being optically observed from a surface side and that is different from a light collecting element due to a refractive index difference between two types of materials including the air and an interface structure, the light collecting element includes at least one polarization reflecting layer (circular polarization reflection layer) and a phase difference layer, the polarization reflecting layer is a circular polarization reflection layer that has selective reflection at a visible light wavelength, transmits certain circularly polarized light, and selectively reflects reverse circularly polarized light, and the phase difference layer transmits light at an angle near a normal direction that does not have a selective reflection wavelength in the range of 380 to 780 nm without change and changes a polarization state of light at an angle tilted from the normal direction by a phase difference, a surface light source and a liquid crystal display device using this collecting element. JP2008-250333A discloses that the outgoing light as polarized light that particularly does not have dependency in an azimuthal angle in a light collecting function can be extracted by the light collecting element having this configuration.

JP2008-250333A discloses that it is preferable that a phase difference layer is arranged between at least two circular polarization reflection layers in which wavelength ranges of selective reflection of the polarized light are overlapped with each other. Particularly, in an example of JP2008-250333A, a light collecting element in which a phase difference layer is arranged between two circular polarization reflection layers having the same wavelength ranges of the selective reflection is obtained by using a layer obtained by fixing a cholesteric liquid crystalline phase as the circular polarization reflection layers.

It is suggested to provide a reflective polarizer between the backlight and the backlight side polarizing plate in accordance with power saving of backlight. The reflective polarizer is an optical element that transmits only light that vibrates in a specific polarization direction among light incident in various directions while vibrating and reflects light that vibrates in the other polarization directions. The reflective polarizer is expected to increase luminance (degree of brightness per unit area of light source) by resolving low light efficiency of LCD as core components of low power LCD in accordance with increase of mobile equipment and low power consumption of home appliances.

For example, JP2003-279739A discloses an optical film in which at least one cholesteric liquid crystal layer (1) and a phase difference layer (2) are laminated, and in which, in the phase difference layer (2), in a case where main refractive indexes in two in-plane directions are $nx_1$ and $ny_1$ (here, $nx_1 \geq ny_1$), a refractive index in a thickness direction is $nz_1$, and a thickness is Dre (nm), an in-plane phase difference: $(nx_1-ny_1) \times Dre$ is 5 nm or less, and in a case where an ordinary light refractive index of the cholesteric liquid crystal layer (1) is no, an extraordinary light refractive index is ne, and a thickness of the cholesteric liquid crystal layer is Dch (nm), when a virtual thickness direction phase difference calculated from these is $RZch=Dch \times (ne-no)/2$, and an average value of in-plane refractive indexes of the phase difference layer (2) is $np=\{(nx_1+ny_1)/2\}$, a thickness direction phase difference: $RZre=Drex(np-nz)$ calculated from these has a relationship of $RZre/(-RZch)=0.05$ to 0.35, and an illumination device and an image display device using these. According to JP2003-279739A, in the configuration, it is possible to provide an optical film that can be used as a luminance enhancement film obtained by applying a phase difference layer to a cholesteric liquid crystal layer, and that has satisfactory visibility in an image display device such as a liquid crystal display device, not only in a case of being seen from a front surface but also even in a case of being obliquely seen.

In an example of JP2003-279739A, a laminate of cholesteric liquid crystal layers (circular polarization reflection layers) of which center wavelengths of the reflection bands are different from each other, a phase difference layer, and an absorptive polarizer are laminated in this order, and a case where a phase difference layer is arranged between two circular polarization reflection layers is not disclosed.

SUMMARY OF THE INVENTION

In the inventions of JP2008-250333A and JP2003-279739A, optical films having various configurations are included. However, when the present inventors mounted the optical films for luminance enhancement having the configurations disclosed in examples of JP2008-250333A and JP2003-279739A to liquid crystal display devices, it was found that the optical films for luminance enhancement looked colored, if a white display is obliquely seen, for example, from a polar angle of 60° or the like.

In this manner, an optical film in which oblique tint change is suppressed in a case where the optical film is incorporated into a liquid crystal display device was not known in the related art.

A problem to be solved by the invention is to provide an optical film that can suppress an oblique tint change in a case where the optical film is incorporated into a liquid crystal display device.

The present inventors conducted research on a liquid crystal display device in which a light collecting element having a configuration disclosed in JP2008-250333A was used as a reflective polarizer of an optical film for luminance enhancement of JP2003-279739A, and found that after light incident in an oblique direction from a backlight to the optical film was circularly polarized and separated into right circularly polarized light and left circularly polarized light at a selective reflection wavelength thereof in the circular polarization reflection layers, a polarization state of one of the right circularly polarized light and the left circularly polarized light that penetrated the circular polarization reflection layers was collapsed by phase difference (for example, retardation Rth of negative C-plate used as phase difference layer in Example 1 of JP2008-250333A in film thickness direction) of respective layers in a film thickness direction when the one of the right circularly polarized light and the left circularly polarized light penetrated a phase difference layer or a circular polarization reflection layer having other selective reflection wavelength. Therefore, it was found that, if a phase difference at all wavelengths of light that penetrated the phase difference layer was 0, the light penetrated without waste in all wavelengths in the same manner, and thus tint balance did not collapse, but, if only light at a certain wavelength sensed phase difference, the transmittance decreased only for the wavelength, and thus transmitted light was colored.

It was found that coloration was not able to be completely removed even if coloring received by one of the right circularly polarized light and the left circularly polarized light that penetrated the circular polarization reflection layers due to an influence of a phase difference in a film thickness direction of the circular polarization reflection layers at the other selective reflection wavelength was improved by inserting the phase difference layer on the outgoing light side of the laminate of the circular polarization reflection layers in the same manner as in the liquid crystal display device on which the optical film for luminance enhancement of a configuration disclosed in JP2003-279739A was mounted.

The present inventors diligently conducted research to find that, if a positive C-plate is inserted between two circular polarization reflection layers of which center wavelengths of reflection bands were different from each other, in a case where circularly polarized light that penetrates the circular polarization reflection layer on the incidence ray side is incident on the circular polarization reflection layer in the other reflection band, a phase difference that is sensed by light incidence on the circular polarization reflection layer in the other reflection band can be cancelled.

A position to which a phase difference layer is inserted is set as a portion between two circular polarization reflection layers of which center wavelengths of the reflection bands are different from each other, and the circular polarization reflection layer arranged closest to the surface of the optical film on the light exit side is arranged so as not to be the circular polarization reflection layer of which the center wavelength of the reflection band is shortest among the circular polarization reflection layers, such that the a range in which a phase difference is required to be compensated is narrowed down. Therefore, it was found that in a case where the circular polarization that penetrated the circular polarization reflection layer on the incidence ray side was incident on the circular polarization reflection layer of the other reflection band and the phase difference layer, influence of the phase difference received by the incidence rays in all wavelengths was able to be easily set as 0, such that coloration was suppressed.

In the above, the present inventors found that an optical film that can suppress oblique tint change in a case where the optical film in which a positive C-plate is arranged between two circular polarization reflection layers of which center wavelengths of reflection bands are different from each other and the circular polarization reflection layer arranged closest to a surface of a light exit side is arranged so as not to be the circular polarization reflection layer of which the center wavelength of the reflection band is shortest among the circular polarization reflection layers is incorporated into the liquid crystal display device, so as to achieve the invention.

That is, the objects are achieved by the invention having configurations below.

[1] An optical film comprising: at least two circular polarization reflection layers; and a first phase difference layer, in which at least one circular polarization reflection layer is arranged on each of the both sides of the first phase difference layer, center wavelengths of reflection bands of the circular polarization reflection layers arranged on both sides of the first phase difference layer are different from each other, in a case where light incident from one surface of the optical film penetrates the first phase difference layer and the circular polarization reflection layers and exits from the other surface of the optical film, the circular polarization reflection layer arranged closest to a surface of the optical film on a light exit side is not the circular polarization reflection layer of which a center wavelength of a reflection band is shortest among the circular polarization reflection layers, and the first phase difference layer is a positive C-plate.

[2] The optical film according to [1], further comprises: a second phase difference layer on the light exit side of the circular polarization reflection layer arranged closest to the surface of the optical film on a light exit side among the circular polarization reflection layers, and it is preferable that retardation Re of the second phase difference layer in an in-plane direction is 100 to 180 nm.

[3] In the optical film according to [2], it is preferable that the second phase difference layer satisfies Expressions (A) to (C), and a difference between front surface Re of the second phase difference layer and Re at an azimuthal angle of 45 degrees and a polar angle of 60 degrees is −30 to 30 nm at a wavelength of 550 nm.

$$450 \text{ nm}/4-40 \text{ nm} < Re(450) < 450 \text{ nm}/4+40 \text{ nm} \quad \text{Expression (A):}$$

$$550 \text{ nm}/4-40 \text{ nm} < Re(550) < 550 \text{ nm}/4+40 \text{ nm} \quad \text{Expression (B):}$$

$$630 \text{ nm}/4-40 \text{ nm} < Re(630) < 630 \text{ nm}/4+40 \text{ nm} \quad \text{Expression (C):}$$

In Expressions (A) to (C), Re (λ) represents retardation in an in-plane direction at a wavelength of λ nm, and a unit is nm.

[4] It is preferable that the optical film according to any one of [1] to [3] further comprises: an absorptive polarizer on a light exit side of the second phase difference layer.

[5] In the optical film according to [4], it is preferable that an angle formed by a slow axis of the second phase difference layer and an absorption axis of the absorptive polarizer is 30° to 60°.

[6] In the optical film according to any one of [1] to [5], it is preferable that at least a circular polarization reflection layer that can reflect light in a red wavelength range, a circular polarization reflection layer that can reflect light in a green wavelength range, and a circular polarization reflection layer that can reflect light in a blue wavelength range are included as the circular polarization reflection layers.

[7] In the optical film according to any one of [1] to [5], it is preferable that at least a circular polarization reflection layer that can reflect light in a red wavelength range and a circular polarization reflection layer that can reflect light in green and blue wavelength ranges are included as the circular polarization reflection layers.

[8] In the optical film according to any one of [1] to [7], it is preferable that the circular polarization reflection layer is a circular polarization reflection layer obtained by fixing cholesteric alignment of a rod-like liquid crystal compound.

[9] In the optical film according to any one of [1] to [8], it is preferable that center wavelengths of reflection bands of the circular polarization reflection layers arranged on both sides of the first phase difference layer are different from each other by 30 nm or greater.

[10] An illumination device comprising: a light source; and the optical film according to any one of [1] to [9].

[11] It is preferable that the illumination device according to [10] further comprises: a reflection member that is arranged on a side of the light source opposite to the optical film and that converts a polarization state of light that is emitted from the light source and is reflected on the optical film and reflects the light.

[12] In the illumination device according to [10] or [11], it is preferable that the light source emits blue light, green light, and red light.

[13] An image display device comprising: the optical film according to any one of [1] to [9] or the illumination device according to any one of [10] to [12].

[14] It is preferable that the image display device according to [13] further comprises: liquid crystal cells.

According to the invention, it is possible to provide an optical film that can suppress oblique tint change in a case where the optical film is incorporated into a liquid crystal display device.

DESCRIPTION OF THE PREFERRED EMBODIMENTS

Figure 1:
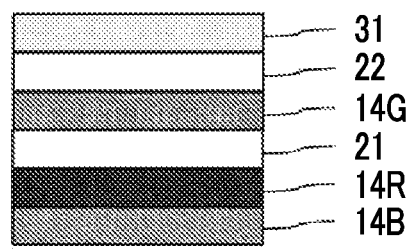
FIG. 1 is a diagram schematically illustrating a layer configuration of an example of an optical film of the invention.

An optical film, an illumination device, and an image display device of the invention are described.

Descriptions of configuration requirements provided below are made based on the representative embodiments of the invention, but the invention is not limited thereto. In this specification, a numerical range by using the expression "to" means a range including numerical values indicated before and after the expression "to" as a lower limit and an upper limit.

[Optical Film]

An optical film of the invention is an optical film having at least two circular polarization reflection layers and a first phase difference layer, and at least one circular polarization reflection layer is arranged on each of both sides of the first phase difference layer. Center wavelengths of reflection bands of the circular polarization reflection layers arranged on both sides of the first phase difference layers are different from each other, and in a case where light incident from the surface of the optical film on one side penetrates the first phase difference layer and the circular polarization reflection layer and exits from the surface of the optical film on the other side, the circular polarization reflection layer arranged closest to the surface of the optical film on the light exit side is not the circular polarization reflection layer of which a center wavelength of the reflection band is shortest, among the circular polarization reflection layers, but the first phase difference layer is a positive C-plate.

With respect to this configuration, in a case where the optical film is incorporated into a liquid crystal display device, an oblique tint change of the optical film of the invention can be suppressed.

In the optical film according to a preferred aspect of the invention, the circular polarization reflection layer forms a reflective polarizer that can reflect light in red light, green light, and blue light wavelength ranges. If the optical film according to this aspect is arranged on the incidence ray side of the backlight side polarizing plate of the image display device such as the liquid crystal display device, it is possible to cause the transmission axis of the backlight side polarizing plate to transmit most of the light from the backlight. That is, the optical film according to the preferred aspect of the invention can be used as a luminance enhancement film that uses light recycle of backlight of the image display device.

In the optical film according to the preferred aspect of the invention, intensity (hereinafter, referred to as intensity of oblique light) of transmitted light when light is incident obliquely, for example, at a polar angle of 60° can be improved, compared with a case where an optical film for luminance enhancement having a configuration disclosed in JP2008-250333A is mounted on the liquid crystal display device. In the optical film according to the preferred aspect of the invention, a mechanism in which intensity of oblique light is improved is as described below.

In JP2008-250333A, a case where obliquely incident light is circularly polarized and separated by the circular polarization reflection layer on the incident side and right circularly polarized light is transmitted is described below. As the circular polarization reflection layer on the exit side, the same circular polarization reflection layer on the incident side is used. Therefore, the circular polarization reflection layer on the exit side transmits right circularly polarized light and reflects left circularly polarized light. In JP2008-250333A, λ/2 phase difference is given according to phase difference of the circular polarization reflection layer by the phase difference layer, right circularly polarized light that penetrates the circular polarization reflection layer on the incident side is converted to left circularly polarized light, the converted left circularly polarized light is reflected on the circular polarization reflection layer on the exit side (luminance is reduced), and the reflected light is returned in a front direction.

In the optical film according to the preferred aspect of the invention, after the obliquely incident light transmits the circular polarization reflection layer on the incident side, phase difference is adjusted to become 0 according to the phase difference of the circular polarization reflection layer by the phase difference layer, such that the circular polarization reflection layer on the exit side can be transmitted with circularly polarized. Therefore, according to the preferred aspect of the invention, the intensity of oblique light is further improved.

Hereinafter, the optical film according to the preferred aspect of the invention is described.

<Configuration>

The configuration of the optical film of the invention is described based on the drawings.

FIG. 1 is a diagram schematically illustrating an example of the optical film of the invention. In a case where a lower side of FIG. 1 is set as an incidence ray side, and an upper side as is set as an outgoing light side, an example of the optical film of the invention illustrated in FIG. 1 has a circular polarization reflection layer (hereinafter, also referred to as a blue light circular polarization reflection layer 14B) that can reflect light in a blue wavelength range in an order from the incidence ray side, a circular polarization reflection layer (hereinafter, also referred to as a red light circular polarization reflection layer 14R) that can reflect light in a red wavelength range, a first phase difference layer 21, a circular polarization reflection layer (hereinafter, also referred to as a green light circular polarization reflection layer 14G) that can reflect light in a green wavelength range, a second phase difference layer 22, and an absorptive polarizer 31.

Figure 9:
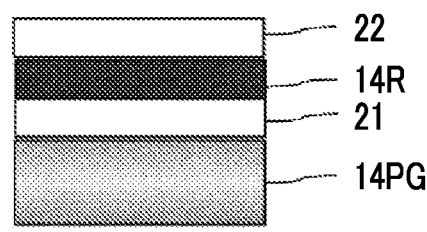
FIG. 9 is a diagram schematically illustrating a layer configuration of another example of the optical film of the invention.

The optical film of the invention has at least two circular polarization reflection layers. The example of the optical film of the invention illustrated in FIG. 1 has three layers of the red light circular polarization reflection layer 14R, the green light circular polarization reflection layer 14C, and the blue light circular polarization reflection layer 14B, as the circular polarization reflection layers. In the optical film of the invention, the number of lamination of the circular polarization reflection layers is preferably 2 to 5, more preferably 2 to 4, and even more preferably 2 or 3. In a case where the optical film of the invention has only two circular polarization reflection layers, it is preferable to use at least one circular polarization reflection layer that can reflect light in a broadband wavelength range as the circular polarization reflection layers. The circular polarization reflection layer that can reflect light in a broadband wavelength range is preferably a circular polarization reflection layer that reflects light in a blue light and green light wavelength range or a circular polarization reflection layer that can reflect light in a green light or red light wavelength range. An example of a case where the optical film of the invention has only two circular polarization reflection layers is illustrated in FIG. 9. In a case where an upper side of FIG. 9 is set as an incidence ray side and a lower side is set as an outgoing light side, an example of the optical film of the invention illustrated in FIG. 9 has a circular polarization reflection layer 14PG that can reflect light in green and blue wavelength ranges in an order from an incidence ray side, the first phase difference layer 21, and the circular polarization reflection layer 14R that can reflect light in a red wavelength range. As described above, it is preferable that, in the optical film, at least two circular polarization reflection layers form a reflective polarizer that at least reflects red light, green light, and blue light.

The optical film of the invention has the first phase difference layer 21.

The optical film of the invention is an optical film in which at least one circular polarization reflection layer is arranged on each of the both sides of the first phase difference layer 21, and center wavelengths of the reflection bands of the circular polarization reflection layers arranged on both sides of the first phase difference layer 21 are different from each other. The example of the optical film of the invention illustrated in FIG. 1 has the blue light circular polarization reflection layer 14B and the red light circular polarization reflection layer 14R on the incidence ray side of the first phase difference layer 21 and the green light circular polarization reflection layer 14G on the outgoing light side of the first phase difference layer 21. A reflection band of the blue light circular polarization reflection layer 14B that is in adjacent (the closest) to the incidence ray side of the first phase difference layer 21 is different from a reflection band of the green light circular polarization reflection layer 14G that is in adjacent (the closest) to the outgoing light side of the first phase difference layer 21.

Figure 2:
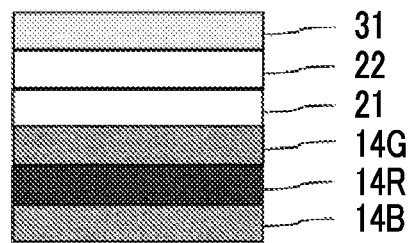
FIG. 2 is a diagram schematically illustrating a layer configuration of an example of an optical film of Comparative Example 5.
Figure 3A:
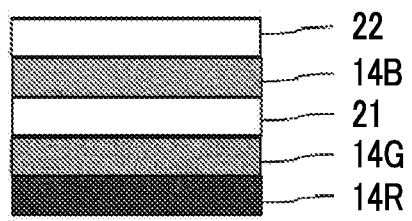
FIGS. 3A and 3B are diagrams schematically illustrating a layer configuration of an example of a optical film of a reference example.
Figure 3B:
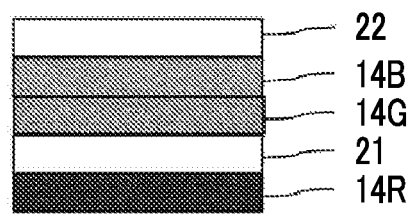
Figure 4A:
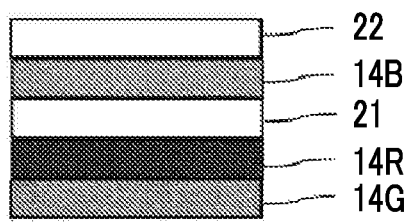
FIGS. 4A and 4B are diagrams schematically illustrating a layer configuration of another example of the optical film of the reference example.
Figure 4B:
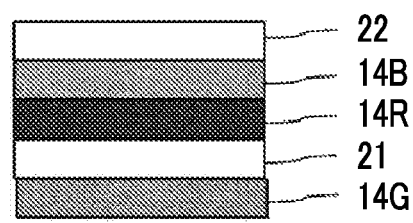
Figure 5A:
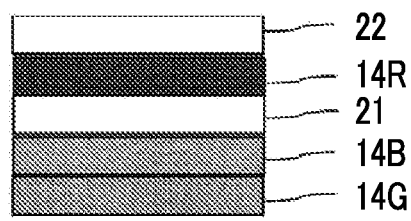
FIGS. 5A and 5B are diagrams schematically illustrating a layer configuration of another example of the optical film of the invention.
Figure 5B:
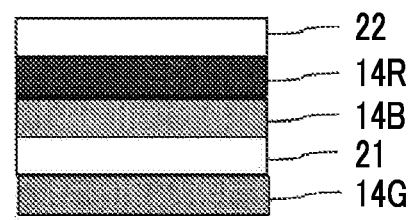
Figure 6A:
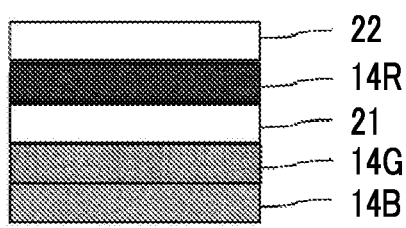
FIGS. 6A and 6B are diagrams schematically illustrating a layer configuration of another example of the optical film of the invention.
Figure 6B:
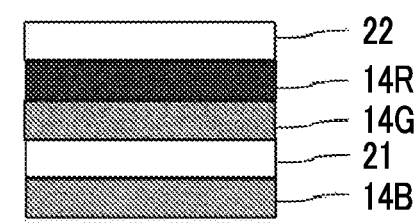
Figure 7A:
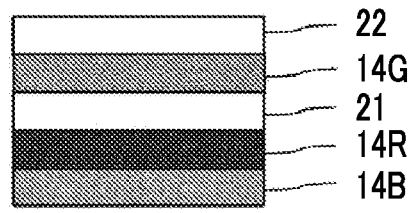
FIGS. 7A and 7B are diagrams schematically illustrating a layer configuration of another example of the optical film of the invention.
Figure 7B:
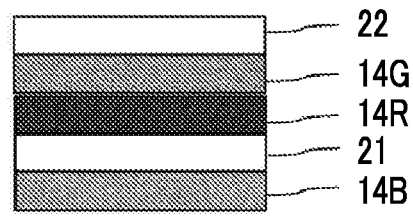
Figure 8A:
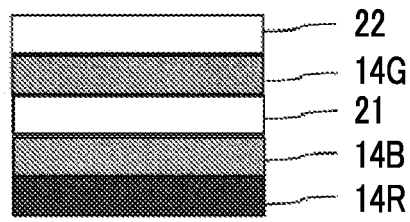
FIGS. 8A and 8B are diagrams schematically illustrating a layer configuration of another example of the optical film of the invention.
Figure 8B:
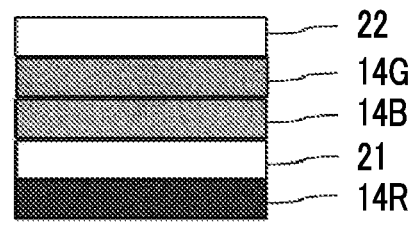

Meanwhile, the configuration of the optical film of Comparative Example 5 described below, which is the configuration disclosed in JP2003-279739A is illustrated in FIG. 2. In a case where the first phase difference layer is arranged between the circular polarization reflection layers (FIG. 1), the oblique tint changes become smaller than those in a case where the first phase difference layer is arranged on the external side of the circular polarization reflection layers (the outgoing light side) (FIG. 2).

In an example of the optical film of the invention illustrated in FIG. 1, for easier description, it is assumed that the second phase difference layer is a λ/4 plate (an abbreviation of a quarter wave plate), it is assumed that the blue light circular polarization reflection layer 14B, the red light circular polarization reflection layer 14R, and the green light circular polarization reflection layer 14G are layers obtained by fixing cholesteric alignment of rod-like liquid crystal compounds, and it is assumed that the first phase difference layer 21 is produced with a rod-like liquid crystal compound. However, the assumptions do not limit the configurations of the optical film according to the invention.

It is known that a reflection band of the circular polarization reflection layer is deviated to a short wave side with respect to the oblique light, the green light circular polarization reflection layer 14G reflects blue light with respect to vertical incident light, the blue light circular polarization reflection layer 14B reflects UV light with respect to vertical incident light, and the red light circular polarization reflection layer 14R reflects green light with respect to vertical incident light.

The polarization state of the incidence rays to the optical film does not receives an influence (as is unpolarized) by phase difference in unpolarized light (light of which a polarization direction is random) before the light penetrating the circular polarization reflection layer. However, circularly polarized light on one side is reflected on the circular polarization reflection layer in the wavelength of the reflection band of the circular polarization reflection layer, and at the same time, is circularly polarized and separated, and a polarization state of the penetrated circularly polarized light receives an influence by phase difference (circular polarization is collapsed).

Here, it is assumed that the circular polarization reflection layer is formed by cholesteric alignment of rod-like liquid crystal compounds, and thus a circular polarization separation layer performs a behavior similar to a C-plate having plus Rth. The first phase difference layer is a positive C-plate that satisfies nz>nx=ny and thus has minus Rth.

In Tables 1 and 2 below, influences of the phase difference in a case where oblique incidence rays are incident from lower sides of respective diagrams on the optical films having configurations of FIGS. 1 and 2 and exist to upper sides.

phase difference layer 21 which is a positive C-plate, and receive an influence of plus Rth by the green light circular polarization reflection layer 14G. If ordered circularly polarized light that does not receive an influence of the phase difference is formed right before incidence to the second phase difference that is assumed as a λ/4 plate, the rays are most effectively converted to linearly polarized light, luminance thereof is enhanced. Therefore, it is desirable that the sum of phase differences received from the first phase difference layer 21 and the green light circular polarization reflection layer 14G becomes 0. If the phase difference of all wavelengths of the oblique incidence rays is 0, the oblique incidence rays penetrate without waste in the same manner in all the wavelength, a balance of tint does not collapse. However, if phase difference of light only in a certain

TABLE 1

|  | Reflection color of obliquely incident light of circular polarization reflection layer | Red obliquely incident light | Green obliquely incident light | Blue obliquely incident light |
|---|---|---|---|---|
| Absorptive polarizer |  |  |  |  |
| Second phase difference layer (λ/4 plate) |  |  |  |  |
| Green light circular polarization reflection layer 14G | Blue |  | Positive | A |
| First phase difference layer |  |  | Negative |  |
| Red light circular polarization reflection layer 14R | Red |  | A |  |
| Blue light circular polarization reflection layer 14B | UV |  |  |  |

TABLE 2

|  | Reflection color of obliquely incident light of circular polarization reflection layer | Red obliquely incident light | Green obliquely incident light | Blue obliquely incident light |
|---|---|---|---|---|
| Absorptive polarizer |  |  |  |  |
| Second phase difference layer (λ/4 plate) |  |  |  |  |
| First phase difference layer |  |  | Negative | Negative |
| Green light circular polarization reflection layer 14G | Blue |  | Positive | A |
| Red light circular polarization reflection layer 14R | Green |  | A |  |
| Blue light circular polarization reflection layer 14B | UV |  |  |  |

In Tables 1 and 2, if light is circularly polarized and separated on a layer with A and senses plus Rth, "positive" is indicated, and if the light senses minus Rth, "negative" is indicated. For example, green oblique incidence rays that are obliquely incident from the blue light circular polarization reflection layer 14B side penetrate the blue light circular polarization reflection layer 14B without receiving an influence of the phase difference, are circularly polarized and separated by the red light circular polarization reflection layer 14R, receive an influence of minus Rth by the first wavelength is sensed, transmittance decreases only at the wavelength, and thus the transmitted light is colored.

In the configuration of FIG. 1, Rth of only the green oblique incidence rays may be adjusted by the first phase difference layer 21. However, in the configuration of FIG. 2, Rth of green oblique incidence rays and blue oblique incidence rays is required to be adjusted by the first phase difference layer 21, and the blue oblique incidence rays only receive an influence of minus Rth by the first phase difference layer 21. Therefore, Rth≈0 cannot be satisfied in all of the wavelengths. Accordingly, oblique tint changes become smaller in the configuration of FIG. 1 in which Rth≈0 can be easily satisfied in all of the wavelengths than in the configuration of FIG. 2.

With respect to the optical film according to the invention, in a case where light that is incident from one surface of the optical film penetrates the first phase difference layer and the circular polarization reflection layers and exits from the other surface of the optical film, the circular polarization reflection layer arranged closest from the surface of the optical film on the light exit side is not the circular polarization reflection layer of which a center wavelength of the reflection band is shortest among the circular polarization reflection layers. The circular polarization reflection layer of which a center wavelength of the reflection band is shortest among the circular polarization reflection layers of the optical film included in FIG. 1 is the blue light circular polarization reflection layer 14B. Therefore, in an example of the optical film of the invention illustrated in FIG. 1, the circular polarization reflection layer arranged closest to the surface of the optical film on the light exit side is the green light circular polarization reflection layer 14Q, and the green light circular polarization reflection layer 14G is not the circular polarization reflection layer of which a center wavelength of the reflection band is shortest among the circular polarization reflection layers of the optical film included in FIG. 1. In FIGS. 5A to 8B, variations of the configuration of the optical film in which the circular polarization reflection layer arranged closest to the surface of the optical film on the light exit side is not the circular polarization reflection layer of which the center wavelength of the reflection band is shortest among the circular polarization reflection layer are illustrated. In the configurations of FIGS. 5A to 8B, if an influence of the phase difference that is received in a case where the oblique incidence rays penetrate the optical film in the same manner as in FIGS. 1 and 2 and Tables 1 and 2 is reviewed, an influence of plus Rth that the oblique incidence rays after being circularly polarized and separated receive from other circular polarization reflection layers is easily cancelled due to an influence of minus Rth received by the first phase difference layer 21 which the positive C-plate is understood. Also in the configurations of FIGS. 5A to 8B, configurations of FIGS. 5A, 5B, 6A, 7A, 8A, and 8B are preferable, since oblique incidence rays after circularly polarized and separated easily cancel the influence of plus Rth received by other circular polarization reflection layers with the influence of minus Rth received by the first phase difference layer 21 which is the positive C-plate. The configurations of FIGS. 5A, 5B, 6A, 7A, 8A, and 8B are different from those of FIGS. 6B and 7B, in that compensation effects of the phase difference layer are easily received, since wavelength ranges that require compensation are sufficiently circularly polarized and separated. Among the configurations of FIGS. 5A to 8B, configurations of FIGS. 5A, 5B, 6A, 7A, 8A, and 8B are more preferable.

Meanwhile, as reference examples, aspects in which circular polarization reflection layers arranged closest to surfaces of the optical films on the light exit sides are the circular polarization reflection layers of which center wavelengths of the reflection bands are shortest among the circular polarization reflection layers are illustrated in FIGS. 3A to 4B. In the configurations of optical films of the reference examples illustrated in FIGS. 3A, 3B, 4A, and 4B, the circular polarization reflection layers of which center wavelengths of the reflection bands are shortest among the circular polarization reflection layers of the optical films are the blue light circular polarization reflection layers 14B. Therefore, in the optical films of the reference examples illustrated in FIGS. 3A, 3B, 4A, and 4B, the circular polarization reflection layers arranged closest to the surface of the optical film on the light exit side are the blue light circular polarization reflection layers 14B, the green light circular polarization reflection layers 14G are circular polarization reflection layers of which center wavelengths of the reflection bands are shortest among the shortest among the circular polarization reflection layers of the optical film included in FIGS. 3A, 3B, 4A, and 4B. In the configurations of these optical films of the reference examples, even in a case where center wavelengths of the reflection bands of the circular polarization reflection layers arranged on both sides of the first phase difference layers 21 are different from each other, it is difficult that the oblique incidence rays after being circularly polarized and separated cancel the influence of plus Rth received by other circular polarization reflection layers with influence of minus Rth received by the first phase difference layers 21 which are the positive C-plates, and suppression of the oblique tint change becomes insufficient.

The optical film according to the invention preferably has the second phase difference layer on the light exit side of the circular polarization reflection layer arranged closest to the surface of the light exit side of the optical film among the circular polarization reflection layers. An example of the optical film according to the invention illustrated in FIG. 1 has the second phase difference layer 22 on the light exit side of the green light circular polarization reflection layer 14G which is the circular polarization reflection layer arranged closest to the surface of the optical film on the light exit side among the circular polarization reflection layers. The second phase difference layer 22 may be a single layer or a laminate of two or more layers.

The optical film according to the invention preferably has an absorptive polarizer on the light exit side of the second phase difference layer. The example of the optical film illustrated in FIG. 1 has the absorptive polarizer 31 on the light exit side of the second phase difference layer 22. The absorptive polarizer 31 may be directly in contact with the second phase difference layer 22 or may be laminated via another layer such as a protective film of the absorptive polarizer, an adhesive layer, or a pressure sensitive adhesive material.

(Thickness)

A total thickness of respective layers in the optical film according to the invention is preferably 300 µm or less, more preferably 1 to 250 µm, and particularly preferably 2 to 200 µm.

<Circular Polarization Reflection Layer>

The optical film according to the invention has at least two circular polarization reflection layers, at least one circular polarization reflection layer is arranged on each of the both sides of the first phase difference layer, and center wavelengths of the reflection bands of the circular polarization reflection layers arranged on both sides of the first phase difference layer.

In the optical film according to the invention, the center wavelengths of the reflection bands of the circular polarization reflection layers arranged on both sides of the first phase difference layer are different from each other preferably by 30 nm or greater, more preferably by 40 to 400 nm, and particularly preferably by 50 to 300 nm.

The circular polarization reflection layer is preferably a circular polarization reflection layer obtained by fixing cholesteric alignment. The optical film according to the invention has at least two circular polarization reflection layers and the laminate of the circular polarization reflection layers preferably exhibits the function of the reflective polarizer.

The reflective polarizer has a function of reflecting blue light, green light, and red light.

It is preferable that an aspect of the optical film of the invention at least has a circular polarization reflection layer that can reflect light in a red wavelength range, a circular polarization reflection layer that can reflect light in a green wavelength range, and a circular polarization reflection layer that can reflect light in a blue wavelength range as the circular polarization reflection layers.

It is preferable that another aspect of the optical film of the invention at least has a circular polarization reflection layer that can reflect light in a red wavelength range and a circular polarization reflection layer that can reflect light in green and blue wavelength ranges, as the circular polarization reflection layers.

According to the invention, a circular polarization reflection layer that can reflect light in a broadband wavelength range also refers to a circular polarization reflection layer that reflects light in at least one color among blue light, green light, and red light and also reflects light in a wavelength range that exceeds the wavelength range of one color. For example, the circular polarization reflection layer that can reflect light in a broadband wavelength range is a layer that reflects blue light and green light with a single layer or a layer that reflects green light and red light with a single layer.

According to the invention, the blue light circular polarization reflection layer, the green light circular polarization reflection layer, and the red light circular polarization reflection layer are respectively a circular polarization reflection layer of which a center wavelength of a reflection band is in a blue light range, a circular polarization reflection layer of which a center wavelength of a reflection band is in a green light range, and a circular polarization reflection layer of which a center wavelength of a reflection band is in a red light range.

According to the invention, the blue light is light in a wavelength of 380 to 499 nm, green light is light in a wavelength of 500 to 599 nm, and red light is light in a wavelength of 600 to 780 nm. The infrared light is light in 780 to 850 nm.

According to the invention, a center wavelength (also referred to as a reflection center wavelength) and a half-width of the reflection band of the circular polarization reflection layer can be obtained as follows.

If a transmission spectrum of the circular polarization reflection layer is measured by using a spectrophotometer UV3150 (Shimadzu Corporation), a declining peak of the transmittance is seen in a selective reflection area. Among two wavelengths having transmittance with ½ height of the greatest peak height, a value of the wavelength on the short wave side is set as $\lambda 1$ (nm) and a value of the wavelength on the long wave side is set as $\lambda 2$ (nm), the center wavelength and the half-width of the reflection band are indicated as the equation below.

Center wavelength of reflection band=$(\lambda 1+\lambda 2)/2$

Half-width=$(\lambda 2-\lambda 1)$

A total film thickness of the circular polarization reflection layer is preferably 2 to 15 μm, more preferably 5.0 μm or greater and less than 10 μm, particularly preferably 5 μm to 8 μm, and more particularly preferably 5 μm or greater and less than 8 μm.

As described above, according to the preferred aspect, a liquid crystal compound for forming cholesteric alignment used for forming the circular polarization reflection layer is described.

The cholesteric liquid crystal compound is a compound that selectively reflects a center wavelength $\lambda$ ($\lambda$=nP, here, n is an average refractive index of liquid crystals) of a reflection band based on a helical period and a half-width $\Delta\lambda$ ($\Delta\lambda$=P$\Delta$n, here, $\Delta$n is anisotropy of a refractive index) with this wavelength as a center and forms cholesteric alignment that transmits light in other wavelength ranges.

With respect to the optical film according to the invention, the circular polarization reflection layer is preferably a circular polarization reflection layer obtained by fixing cholesteric alignment of rod-like liquid crystal compounds, since Rth can be easily cancelled when the optical film is incorporated into the positive C-plate. That is, when the circular polarization reflection layer of the optical film of the invention is formed, an aspect of using rod-like cholesteric liquid crystals is preferable.

(Rod-Like Liquid Crystal Compound)

As the rod-like liquid crystal compound, azomethines, azoxys, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexylbenzonitriles are preferable. Not only such a low molecular liquid crystal molecule but also the high molecular liquid crystal molecule can be used.

It is more preferable to fix alignment by polymerizing a rod-like liquid crystal compound. As the polymerizable rod-like liquid crystal compound, compounds disclosed in Makromol. Chem., Vol. 190, page 2255 (1989), Advanced Materials Vol. 5, page 107 (1993), U.S. Pat. No. 4,683,327A, U.S. Pat. No. 5,622,648A, U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A can be used. As the rod-like liquid crystal compound, for example, compounds disclosed in JP1999-513019A (JP-H11-513019A) or JP2007-279688A can be also preferably used. As the rod-like liquid crystal compound, it is also preferable to use liquid crystal compounds disclosed in [0020] and [0021] of JP2003-279739A. Disclosure of these publications is incorporated to this specification.

(Disc-Like Liquid Crystal Compound)

As the disc-like liquid crystal compound, for example, compounds disclosed in JP2007-108732A and JP2010-244038A can be preferably used, but the invention is not limited thereto.

Hereinafter, preferable examples of the disc-like liquid crystal compound are provided, but the invention is not limited thereto.

Compound 1

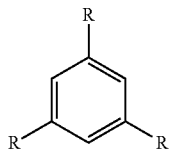

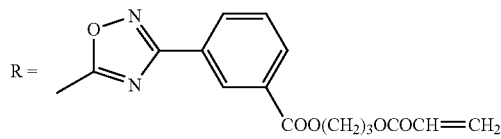

Compound 2

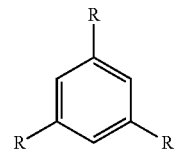

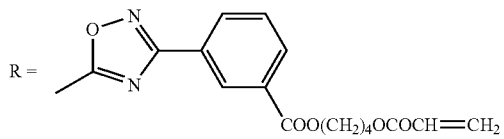

Compound 101

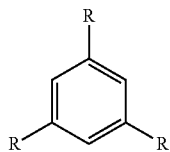

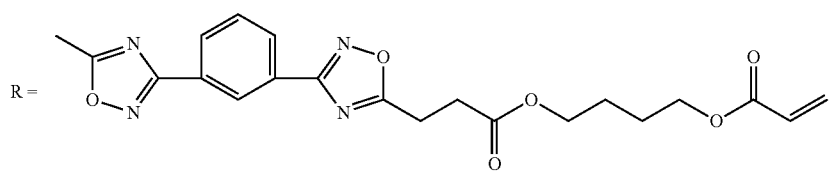

Compound 102

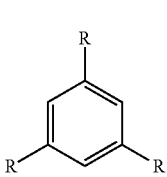

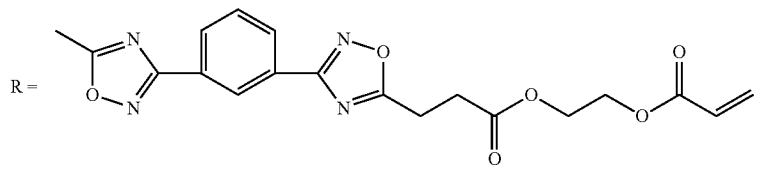

As the method of causing the cholesteric liquid crystal layer to be broadband, high Δn liquid crystals can be used or pitch gradient can be used.

With respect to the liquid crystal compound used in the circular polarization reflection layer obtained by fixing cholesteric alignment, about 0.06≤Δn≤0.5 is practical (materials disclosed in high Δn liquid crystals disclosed in JP2011-510915A), and the half-width thereof corresponds to 15 nm to 150 nm.

A pitch gradient method that can realize a wide half-width can be used by gradually changing not a single pitch but the number of pitches in a cholesteric helical direction. The pitch refers to a thickness of a molecule layer when an alignment direction of the molecule layer rotates by 360 degrees.

According to the invention, the compound concentration that do not form a helix in a thickness direction of the liquid crystal layer is continuously changed in a thickness direction of the liquid crystal layer, the concentration of the chiral agent is continuously changed in the thickness direction of the liquid crystal layer, or when the circular polarization reflection layer is formed by using a chiral agent having a photoisomerization moiety, photoisomerization moieties of a chiral agent are isomerizes with UV irradiation or the like so as to change helical twisting power (HTP) of the chiral agent, such that the invention can be achieved. As the photoisomerization moieties, a vinylene group, an azo group, and the like are preferable.

The pitch gradient method can be achieved by methods disclosed in (Nature 378, 467-469 1995), JP4990426B, or JP2005-265896A.

(Chiral Agent)

The chiral agent is a compound for adjusting a helical period of a cholesteric liquid crystal compound, and also referred to as a "chiral agent". According to the invention, well-known various chiral agents (for example, disclosed in Liquid crystal device handbook, Chapter 3, Section 4-3, chiral agents for TN or STN, page 199, edited by 42nd Committee of Japan Society for the Promotion of Science, in 1989) can be used. The chiral agent generally includes asymmetric carbon atoms, but an axial asymmetric compound or a planar asymmetric compound not including asymmetric carbon atoms also can be used as chiral agents. Examples of the axial asymmetric compound or the planar asymmetric compound include binaphthyl, helicene, paracyclophane, and derivatives thereof. The chiral agent may have a polymerizable group. In a case where the chiral agent has a polymerizable group and the rod-like liquid crystal compound used together also has a polymerizable group, it is possible to form a polymer having a repeating unit derived from a rod-like liquid crystal compound and a repeating unit derived from a chiral agent by polymerization reaction between the chiral agent having a polymerizable group and the polymerizable rod-like liquid crystal compound. According to this aspect, the polymerizable group that the chiral agent having the polymerizable group has is preferably the same group as the polymerizable group that the polymerizable rod-like liquid crystal compound has. Accordingly, the polymerizable group of the chiral agent is preferably an unsaturated polymerizable group, an epoxy group, or an aziridinyl group, and more preferably an unsaturated polymerizable group, and particularly preferably an ethylenically unsaturated polymerizable group.

The chiral agent may be a liquid crystal compound. Examples of the chiral agent exhibiting high twisting power include chiral agents disclosed in JP2010-181852A, JP2003-287623A, JP2002-80851A, JP2002-80478A, and JP2002-302487A, and can be preferably used in the invention. As isosorbide compounds disclosed in these publications, isomannide compounds having corresponding structures can be used, and as isomannide compounds disclosed in these publications, isosorbide compounds having corresponding structures can be used.

(Surfactant)

The surfactant used in the circular polarization reflection layer can be appropriately selected without particular limitation. Surfactants disclosed in [0103] to [0144] of JP2009-193046A are exemplified as specific examples, surfactants disclosed in [0140] to [0147] of JP2013-242555A are exemplified as low molecular surfactants, and surfactants disclosed in [0020] to [0118] of JP2005-179636A and [0016] to [0032] of JP2013-228433A are exemplified as high molecular surfactants, but the invention is not limited thereto. Among these, surfactants disclosed in [0020] to [0118] of JP2005-179636A are more preferable, and an additive having a partial structure represented by Formula 1 below is particularly preferable.

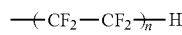
Formula 1

In Formula 1, n represents an integer of 1 to 5. n preferably represents an integer of 2 to 4 and more preferably 3 or 4.

In view of reducing alignment defects and reducing cissing, a high molecular surfactant is preferable.

The weight-average molecular weight of the high molecular surfactant is preferably 5,000 or greater, more preferably 6,000 or greater, and particularly preferably 7,000 or greater.

As the high molecular surfactant, a fluorine-based surfactant, a silicone-based surfactant, and a compound having an alkyl chain having 4 or more carbon atoms are preferable, a fluorine-based surfactant and a compound having an alkyl chain having 4 or more carbon atoms are more preferable, and a fluorine-based surfactant is most preferable. In this manner, if a surfactant is used, alignment defects are reduced, and cissing can be reduced. Therefore, the surfactant is suitable for a light reflection film.

The additive having a partial structure represented by Formula 1 is preferably a high molecular surfactant.

As the fluorine-based surfactant, a weight content of a monomer unit having fluorine is preferably 40% or greater, more preferably 60% or greater, and most preferably 80% or greater. If the content of the monomer unit having fluorine is great, film thickness unevenness hardly occurs. Therefore, alignment time or alignment defects are reduced, and thus properties of a luminance enhancement film become satisfactory.

As the fluorine-based surfactant, for example, a polymer having a fluorinated alkyl group having 1 to 20 carbon atoms (here, it may be interrupted by an ether bond, an ester bond, a carbonyl group, or an urethane bond) and an amphipathic group on a side chain is preferable.

The fluorinated alkyl group is not particularly limited, as long as the fluorinated alkyl group has 1 to 20 carbon atoms and may be interrupted by an ether bond (—O—), an ester bond (—CO—O—), a carbonyl group (—CO—), or an urethane bond (—NH—CO—O—). However, an fluorinated alkyl group that is not interrupted by these groups, that is, an fluorinated alkyl group that is represented by —$C_kH_lF_m$ (k represents an integer of 1 to 20, 1 represents an integer of 0 to 40, m represents an integer of 1 to 41, and l+m=2k+1 is satisfied) is preferable.

It is preferable that the fluorinated alkyl group includes a perfluoroalkyl group having 1 to 10 carbon atoms and the remaining carbon atoms are not fluorinated. The number of carbon atoms of the perfluoroalkyl group is more preferably 3 to 10.

Meanwhile, examples of the amphipathic group include groups included in well-known nonionic surfactants in the related art. However, it is preferable to include an alkylene group interrupted by an ether bond, an ester bond, or a carbonyl group. Among these, it is preferable to include a polyalkyleneoxy group (a polyethyleneoxy group, a polypropyleneoxy group, and a polybutyleneoxy group).

In the producing of an additive having a partial structure represented by Formula 1 which is a high molecular surfactant, a fluoroaliphatic group-containing monomer represented by Formula (A1) below is suitably used.

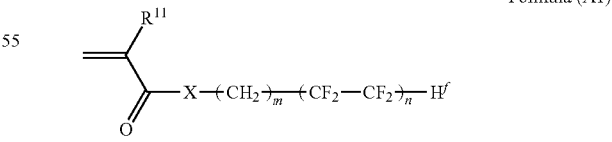
Formula (A1)

In Formula (A1) above, $R^{11}$ represents a hydrogen atom or a methyl group, X represents an oxygen atom, a sulfur atom, or —N($R^{12}$)— ($R^{12}$ represents a hydrogen atom or an alkyl group having 1 to 4 carbon atoms, preferably represents a hydrogen atom or a methyl group), $H^f$ represents a hydrogen atom or a fluorine atom, m represents an integer of 1 to 6, and n represents an integer of 1 to 5.

X preferably represents an oxygen atom, H$^f$ preferably represents a hydrogen atom, m preferably represents 1 or 2, n preferably represents 3 or 4, and a mixture thereof may be used.

A preferred aspect of the fluoroaliphatic group-containing monomer represented by Formula (A1) is the same as the preferred aspect of the fluoroaliphatic group-containing monomer represented by Formula (A1) in JP2005-179636A.

The fluorine-based surfactant as above can be obtained by at least polymerizing the monomer having a fluorinated alkyl group and the monomer having an amphipathic group. As the monomer having a fluorinated alkyl group and the monomer having an amphipathic group, monomers respectively represented by Formulae (h1) and (h2) below are preferable.

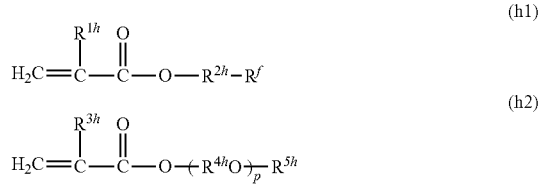

In Formula (h1), $R^{1h}$ represents a hydrogen atom or a methyl group, $R^{2h}$ represents a linear, branched chain-like, or cyclic alkylene group having 1 to 15 carbon atoms and preferably having 1 to 10 carbon atoms, and $R^f$ represents a perfluoroalkyl group having 1 to 5 carbon atoms, and preferably having 3 to 5 carbon atoms.

In Formula (h2) above, $R^{3h}$ represents a hydrogen atom or a methyl group, $R^{4h}$ represents an alkylene group having 2 to 4 carbon atoms, $R^{5h}$ represents a hydrogen atom or an alkyl group having 1 to 15 carbon atoms and preferably having 1 to 10 carbon atoms.

In Formula (h2), p represents an integer of 1 to 50.

Specific examples of the monomer represented by Formula (h1) above include 2,2,2-trifluoroethyl (meth)acrylate, 2,2,3,3,3-pentafluoropropyl (meth)acrylate, 2-(perfluorobutyl)ethyl (meth)acrylate, and 2-(perfluoro-3-methylbutyl) ethyl (meth)acrylate.

Specific examples of the monomer represented by Formula (h2) above are (meth)acrylic acid methoxypolyethylene glycol ester [for example, the number (r) of ethylene glycol repeating units is 1 to 50], (meth)acrylic acid methoxypolypropylene glycol ester [for example, the number (r) of propylene glycol repeating units is 1 to 50], (meth)acrylic acid methoxypoly(ethylene-propylene) glycol ester [for example, the sum (r) of the number of ethylene glycol repeating units and the number of propylene glycol repeating units is 2 to 50], (meth)acrylic acid methoxypoly (ethylene-tetramethylene) glycol ester [for example, the sum (r) of the number of ethylene glycol repeating units and the number of tetramethylene glycol repeating units is 2 to 50], (meth)acrylic acid butoxypoly(ethylene-propylene) glycol ester [for example, the sum (r) of the number of ethylene glycol repeating units and the number of propylene glycol repeating units is 2 to 50], (meth)acrylic acid octoxypoly (ethylene-propylene) glycol esters [for example, the sum (r) of the number of ethylene glycol repeating units and the number of propylene glycol repeating units is 2 to 50], (meth)acrylic acid lauroxypolyethylene glycol ester [for example, the number (r) of ethylene glycol repeating units is 2 to 50], (meth)acrylic acid lauroxypoly(ethylene-propylene) glycol ester [for example, the sum (r) of the number of repeating units of ethylene glycol and the number of propylene glycol repeating units is 2 to 50], polyethylene glycol (meth)acrylate, polypropylene glycol (meth)acrylate, polyethylene glycol-polypropylene glycol (meth)acrylate, polyethylene glycol-polybutylene glycol (meth)acrylate, and polystyrylethyl (meth)acrylate, or LIGHT ESTER HOA-MS, LIGHT ESTER HOMS, and the like manufactured by Kyoeisha Chemical Co., Ltd.

The fluorine-based surfactant may be a surfactant obtained by polymerizing (meth)acrylic acid alkyl ester without departing from the gist of the invention, in addition to the monomer represented by Formula (h1) above and the monomer represented by Formula (h2) above. Specific examples of the (meth)acrylic acid alkyl ester include methyl (meth)acrylate, ethyl (meth)acrylate, n-propyl (meth)acrylate, i-propyl (meth)acrylate, n-butyl (meth)acrylate, i-butyl (meth)acrylate, n-octyl (meth)acrylate, 2-ethylhexyl (meth)acrylate, i-nonyl (meth)acrylate, lauryl (meth)acrylate, hexadecyl (meth)acrylate, stearyl (meth)acrylate, cyclohexyl (meth)acrylate, benzyl (meth)acrylate, isobornyl (meth)acrylate.

The fluorine-based surfactant may be any one of a random polymer and a graft polymer, but a graft polymer is preferable.

(Other Components)

The composition according to the invention that is used for forming the circular polarization reflection layer obtained by fixing cholesteric alignment may contain other components such as a polymerization initiator and an alignment assistant agent, in addition to the cholesteric liquid crystal materials. As materials for forming the circular polarization reflection layer, it is preferable to use materials disclosed in JP2008-250333A and JP2003-279739A.

Examples of the photopolymerization initiator include α-carbonyl compounds (disclosed in U.S. Pat. No. 2,367,661A and U.S. Pat. No. 2,367,670A), acyloin ether (disclosed in U.S. Pat. No. 2,448,828A), α-hydrocarbon-substituted aromatic acyloin compounds (disclosed in U.S. Pat. No. 2,722,512A), polynuclear quinone compounds (disclosed in U.S. Pat. No. 3,046,127A and U.S. Pat. No. 2,951,758A), combinations of triaryl imidazole dimer and para-aminophenyl ketone (disclosed in U.S. Pat. No. 3,549,367A), acridine and phenazine compounds (disclosed in JP1985-105667A (JP-S60-105667A) and U.S. Pat. No. 4,239,850A), and oxadiazole compounds (disclosed in U.S. Pat. No. 4,212,970A), and acylphosphine oxide compounds (disclosed in JP1988-40799B (JP-S63-40799B), JP1993-29234B (JP-H05-29234B), JP1998-95788A (JP-H10-95788A), and JP998-29997A (JP-H10-29997A)).

(Rth)

Generally, retardation Rth of a certain layer in a film thickness direction is defined as $Rth=\{(nx+ny)/2-nz\} \times d$.

(In the equation, nx represents a refractive index in an in-plane slow axis direction, ny represents a refractive index in a direction orthogonal to nx in a plane, nz represents a refractive index in a direction orthogonal to nx and ny)

In the circular polarization reflection layer obtained by fixing the cholesteric alignment, if an ordinary light refractive index no and an extraordinary light refractive index ne of the liquid crystal are used, an average value of in-plane refractive indexes are represented by $(nx+ny)/2=(no+ne)/2$.

Since the refractive index of the film thickness direction is set as no, Rth of the circular polarization reflection layer obtained by fixing the cholesteric alignment is represented in the equation below. Rth of the circular polarization reflection layer employs a value calculated by using the equation below and Rth of the circular polarization reflection layer at the wavelength of λ nm is described as Rth (λ).

$$Rth=\{(no+ne)/2-no\} \times d=\{(ne-no)/2\} \times d$$

ne and no can be measured by an Abbe refractometer.

<First Phase Difference Layer>

The optical film according to the invention has the first phase difference layer arranged between the circular polarization reflection layers of which center wavelengths of the reflection bands are different from each other and the first phase difference layer is the positive C-plate.

The positive C-plate used in the first phase difference layer is not particularly limited. Here, the positive C-plate refers to a layer satisfying nz>nx=ny.

The retardation Re of the first phase difference layer in the in-plane direction is preferably 0 to 30 nm, more preferably 0 to 20 nm, and particularly preferably 0 to 10 nm.

Optimum points of the retardation Rth of the first phase difference layer in the film thickness direction are different from each other depending on configurations, wavelength ranges to be compensated, and the thickness of the circular polarization reflection layers. However, it is preferable to cause the total phase difference of all layers after circular polarization separation to be set as 0 so as not to influence on the oblique light that penetrates the circular polarization reflection layer. The retardation Rth of the first phase difference layer in the film thickness direction for causing the total phase difference of all layers after circular polarization separation to be set as 0 so as not to influence on the oblique light that penetrates the circular polarization reflection layer can be designed by inversely calculate the movement of the second phase difference layer that the oblique light lastly penetrates by using a poincare sphere and calculating the size of Rth such that the oblique light becomes linearly polarized light parallel to the transmission axis of the polarizer after penetrating the second phase difference.

The first phase difference layer described above preferably includes a liquid crystal compound and more preferably includes a rod-like liquid crystal compound. A preferred aspect of the rod-like liquid crystal compound used in the first phase difference layer is the same as the preferred aspect of the rod-like liquid crystal compound used in the circular polarization reflection layer.

Meanwhile, as the first phase difference layer described above, a resin film exhibiting a function as a positive C-plate may be used. Examples thereof include a stretched film obtained by using a resin having a negative intrinsic birefringence value such as a styrene-maleic anhydride copolymer.

As the first phase difference layer, it is preferable to use a positive C-plate among C-plates disclosed in [0032] to [0034] and [0037] to [0039] of JP2008-25033A. It is also preferable to use positive C-plates among phase difference layers (2) disclosed in [0012] and [0025] to [0049] of JP2003-279739A. Disclosure of these publications is incorporated to this specification.

The first phase difference layer described above can be formed by the method well-known in the art. For example, the first phase difference layer can be obtained as a laminate obtained by forming a layer obtained by fixing alignment of a liquid crystal compound on a support such as a cellulose acylate film. For example, if the first phase difference layer is set as a layer obtained by fixing vertical alignment of the rod-like liquid crystal compound, a positive C-plate having minus Rth can be obtained.

A resin film having a positive C-plate can be obtained by using and stretching a resin having a negative intrinsic birefringence value.

<Second Phase Difference Layer>

The optical film according to the invention has a second phase difference layer of a light exit side of a circular polarization reflection layer arranged closest to a surface of a light exit side of the optical film described above, among the circular polarization reflection layers and retardation Re of the second phase difference layer in the in-plane direction is preferably 100 to 180 nm. The second phase difference layer is more preferably a λ/4 plate. The λ/4 plate is a layer for converting circularly polarized light that passes through a reflective polarizer into linearly polarized light.

The second phase difference layer and the circular polarization reflection layer obtained by fixing cholesteric alignment rod-like liquid crystal compounds are in direct contact with each other or may be laminated via other layers, an adhesive layer, or a pressure sensitive adhesive material.

A preferred aspect of the disc-like liquid crystal compound used in the second phase difference layer is the same as the preferred aspect of the disc-like liquid crystal compound of the circular polarization reflection layer.

Meanwhile, as the second phase difference layer, a resin film may be used. Examples thereof include a stretched film obtained by using a material having a positive intrinsic birefringence value such as a norbornene resin and a material having a negative intrinsic birefringence value such as a styrene-maleic anhydride copolymer.

As the second phase difference layer, phase difference layers (3) disclosed in [0013], [0014], and [0050] to [0052] of JP2003-279739A are preferably used. Disclosure of these publications is incorporated to this specification.

In the optical film according to the invention, it is preferable that the second phase difference layer described above is broadband. The second phase difference layer preferably has small polar angle dependency. It is preferable that the second phase difference layer is broadband and has small polar angle dependency. Here, the expression "broadband" means that Re (for example, Re (450), Re (550), and Re (650)) at respective measurement wavelengths λ of blue light, green light, and red light are close to λ/4, and the expression "small polar angle dependency" means that phase difference (Re) stays near λ/4 even when the polar angle is tilted by 60 degrees with respect to Re of the front surface.

A difference of Re between the front direction and the oblique direction can be used as an index representing that polar angle dependency is small. When a front surface Re (that is, Re at an azimuthal angle of 0 degrees and a polar angle of 0 degrees) of the second phase difference layer is set as A, Re at an azimuthal angle of 45 degrees and a polar angle of 60 degrees with respect to an in-plane slow axis is set as B, a difference (B-A) between the front surface Re of the second phase difference layer and Re at an azimuthal angle of 45 degrees and a polar angle of 60 degrees is preferably −30 to 30 nm, more preferably −25 to 25 nm, and particularly preferably −20 to 20 nm at a wavelength of 550 nm. The polar angle θ° direction of the second phase difference layer means a direction tilted by θ° from the vertical direction toward the surface direction of the second phase difference layer with respect to the surface of the second phase difference layer, and a vertical direction with respect to the surface of the second phase difference layer has a polar angle of 0°, and the surface direction of the second phase difference layer has a polar angle of 90°.

In a case where the circular polarization reflection layer is formed by fixing the cholesteric alignment of the rod-like liquid crystal compound on the second phase difference layer including the disc-like compound, the cholesteric alignment of the rod-like liquid crystal compounds is achieved by causing the rod-like liquid crystal compounds to come into direct contact with an underlayer including the disc-like compound. Therefore, underlayer may require high anchoring force for aligning rod-like liquid crystals. The anchoring force can be increased, for example, by using alignment of the disc-like compound. Specifically, molecular long axes of the rod-like liquid crystal compounds can be aligned along the molecular long axis of the disc-like compound. As another method, for example, the disc-like compound surface can be increased by a rubbing treatment.

In a case where the former alignment of the disc-like compound is used, structures of the disc-like compound and the rod-like liquid crystal compound are greatly different from each other, and thus sufficient anchoring force may not be obtained in some cases. In this case, the insufficient anchoring force can be improved, for example, by adding additives that have similar characteristics of the underlayer or the layer formed on the underlayer such as SP values or shapes to the layer formed on the underlayer and/or to the underlayer. Specifically, in order to cause the shape to be similar, a method of adding rod-like compounds to a disc-like compound layer of the underlayer or a method of adding disc-like compounds to a rod-like liquid crystal compound layer of the layer formed on the underlayer can be exemplified.

The rod-like compound in a case of adding the rod-like compounds is preferably a compound having mesogen that is the same as the rod-like liquid crystal compound of the layer formed on the underlayer and more preferably the rod-like compound that is the same as the layer formed on the underlayer.

The disc-like compound in a case of adding the disc-like compound is preferably a compound having mesogen which is the same as the disc-like compound of the underlayer and more preferably a disc-like compound which is the same as the underlayer.

In a case where the latter rubbing treatment is used, it is preferable that polymers that can increase anchoring force by rubbing are unevenly distributed on the surface of the layer including the disc-like compound of the underlayer. The underlayer on which the polymers are unevenly distributed can be produced by applying a mixture liquid of the disc-like compound and the polymer. Generally, the polymer that can increase anchoring force by rubbing is not particularly limited, as long as the polymer can align liquid crystals. Examples thereof include an acrylic polymer, a polyvinyl alcohol-based polymer, a polyimide-based polymer, a polyamic acid-based polymer, a polystyrene-based polymer, a polyethylene terephthalate-based polymer, and a polyvinylcarbazole-based polymer.

In a case where the rod-like compound is laminated on the underlayer including the disc-like compound, a phenomenon in which the rod-like liquid crystals of the layer formed on the underlayer are not smoothly applied and flicked may occur. In this case, a flicking phenomenon can be suppressed in a general way. This problem is also a problem of wettability of the underlayer and the layer formed on the underlayer, and thus wettability can be greatly improved by performing a treatment of increasing surface energies of the underlayer. Examples of the treatment method include treatments increasing a polar functional group such as a hydroxyl group, a carboxyl group, and a carbonyl group. Examples of the treatment include a plasma treatment and a UV treatment. Wettability can be improved by a method of decreasing surface energies of the layer formed on the underlayer by adding additives that decrease surface energies to the layer formed on the underlayer. Examples of the additive in this case include additives using fluorine like as a material, such as the surfactant.

The second phase difference layer preferably includes a surfactant.

The second phase difference layer and the circular polarization reflection layer respectively include additives having the partial structure represented by Formula 1 below and the content of the additive having the partial structure represented by Formula 1 in the circular polarization reflection layer is preferably the content of the additive having the partial structure represented by Formula 1 in the second phase difference layer or greater;

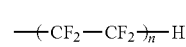

Formula I

In Formula 1, n represents an integer of 1 to 5.

According to the invention, in a case where the second phase difference layer includes a disc-like liquid crystal compound, the second phase difference layer is preferably a layer in which the disc-like liquid crystal compounds are aligned in the second phase difference layer and it is more preferable that the disc-like liquid crystal compounds are vertically aligned.

The expression "vertical alignment" of the disc-like liquid crystal compounds refers to a state in which surfaces of the disc-like liquid crystal compound which are vertical to a director are vertical to air surface of the film or the underlayer. The expression "vertical" herein is not required to be vertical (an angle formed by a surface and a straight line is 90°) in a strict sense, and optical errors are accepted. For example, an angle formed by the air surface of the disc-like liquid crystal compound or the underlayer with a plane vertical to directors of the disc-like liquid crystals is preferably 90°±20°, more preferably 90°±15, and particularly preferably 90°±10°.

Herein, among arbitrary films, a film in which the disc-like liquid crystal compounds are vertically aligned can be checked by a method below.

The vertical alignment of the disc-like liquid crystal compound can be measured, for example, by measuring Re and Rth with Axoscan manufactured by Axometrics, Inc.

With respect to the vertical alignment of the disc-like liquid crystal compounds that does not form a cholesteric liquid crystalline phase, if Re represents a positive value, vertical alignment can be checked.

With respect to the vertical alignment of the disc-like liquid crystal compound that forms the cholesteric liquid crystalline phase, if Rth represents a negative value, it is checked that Rth represents the vertical alignment.

In arbitrary films, a film in which the disc-like liquid crystal compound is vertically aligned and the cholesteric alignment is represented can be checked by the following method.

For example, if Rth is measured with Axoscan manufactured by Axometrics, Inc. and Rth is a negative value, vertical alignment can be checked. If an UV absorption spectrum is measured and a wavelength that selectively reflects light exists, the cholesteric alignment can be checked. In a case where visible light is reflected, if it is checked that only either of a right circularly polarizing plate and a left circularly polarizing plate transmits reflected light, it can be checked that selective reflection occurs, and thus it can be checked that cholesteric alignment is formed.

As a method of obtaining Rth of the cholesteric liquid crystal layer (a layer obtained by fixing a cholesteric liquid crystalline phase, and a light reflecting layer obtained by fixing a cholesteric liquid crystalline phase), a method obtained by using polarized ellipso can be applied.

For example, if an ellipso measurement method disclosed in M. Kimura et al. Jpn. J. Appl. Phys. 48 (2009) 03B021 is used, it is possible to obtain thicknesses, pitches, and torsion angles of the cholesteric liquid crystal layer, and the like can be obtained, and values of Rth can be obtained from the values.

In the preferred aspect of the optical film, the phase difference of the circular polarization reflection layer in the thickness direction generated in a case where the circular polarization reflection layer is seen from an oblique alignment by adjusting retardation (Rth) of the second phase difference layer in the thickness direction can be cancelled. In this configuration, in a case where the optical film according to the invention is incorporated into a liquid crystal display device, oblique tint change can be easily suppressed.

The Rth (550) of the second phase difference layer is preferably −140 to 140 nm, more preferably −120 to 120 nm, particularly preferably −80 to 80 nm, and more particularly preferably −70 to 70 nm.

The second phase difference layer preferably satisfies Expressions (A) to (C) below, since the second phase difference layer can be easily used as a broadband λ/4 plate.

450 nm/4−40 nm<$Re$(450)<450 nm/4+40 nm     Expression (A):

550 nm/4−40 nm<$Re$(550)<550 nm/4+40 nm     Expression (B):

630 nm/4−40 nm<$Re$(630)<630 nm/4+40 nm     Expression (C):

(In Expressions (A) to (C), Re (λ) represents retardation (unit: nm) in an in-plane direction at a wavelength of λ nm)

It is more preferable that the second phase difference layer above satisfy Expressions (A-1), (B-1), and (C-1).

450 nm/4−35 nm<$Re$(450)<450 nm/4+35 nm     Expression (A-1):

550 nm/4−35 nm<$Re$(550)<550 nm/4+35 nm     Expression (B-1):

630 nm/4−35 nm<$Re$(630)<630 nm/4+35 nm     Expression (C-1):

(In Expressions (A-1), (B-1), and (C-1), Re (λ) represents retardation (unit: nm) in an in-plane direction at a wavelength of λ nm)

The film thickness of the second phase difference layer preferably in the range of 0.1 to 10 μm, more preferably in the range of 0.1 to 2 μm, even more preferably in the range of 0.1 to 1.5 μm.

As the method of producing the second phase difference layer, for example, methods disclosed in JP1996-271731A (JP-H08-271731A) can be used.

<Support and Alignment Film>

It is preferable that the optical film further includes a support and an alignment film formed on the support, and the second phase difference layer is brought into direct contact with the alignment film to be laminated.

(Support)

The support is not particularly limited, but it is preferable that the support is a transparent support with a low haze.

The support of the optical film preferably includes cellulose ester and more preferably includes cellulose ester as a main component (by 50 mass % or greater). The support may be a single layer or may be a laminate of two or more layers.

Rth of the support is preferably −40 to 120 nm, more preferably 0 to 80 nm, and even more preferably 20 to 60 nm.

The thickness of the support is preferably 10 to 80 μm, more preferably 10 to 70 μm, and even more preferably 10 to 60 μm.

(Alignment Film)

The optical film may include or may not include an alignment film. However, in a case of using a support including cellulose ester, the optical film preferably includes an alignment film.

In the example of the polymer that can be used in the alignment film, examples thereof include a methacrylate-based copolymer, a styrene-based copolymer, polyolefin, polyvinyl alcohol, modified polyvinyl alcohol, poly(N-methylol acrylamide), polyester, polyimide, a vinyl acetate copolymer, carboxymethyl cellulose, and polycarbonate disclosed in paragraph number [0022] of JP1996-338913A (JP-H08-338913A). A silane coupling agent can be used as a polymer. A water soluble polymer (for example, poly(N-methylol acrylamide), carboxymethyl cellulose, gelatin, polyvinyl alcohol, and modified polyvinyl alcohol) are preferable, gelatin, polyvinyl alcohol, and modified polyvinyl alcohol are more preferable, and polyvinyl alcohol and modified polyvinyl alcohol are most preferable.

The film thickness of the alignment film is preferably in the range of 0.1 to 10 μm, more preferably 0.1 to 2 μm, and even more preferably 0.1 to 1 μm.

<Absorptive Polarizer>

The optical film according to the invention preferably has an absorptive polarizer on a light exit side of the second phase difference layer.

An absorptive polarizer can be obtained by methods disclosed in JP2006-293275A, JP2009-98653A, and JP2001-350021A.

In the optical film according to the invention, an angle formed by a slow axis of the second phase difference layer and an absorption axis of the absorptive polarizer is preferably 30° to 60°. It is preferable that an angle formed by the slow axis of the second phase difference layer and an absorption axis of the polarizer is 30° to 60°, the absorptive polarizer, the second phase difference layer, and the circular polarization reflection layers are brought into direct contact with each other in this order from the outgoing light side, or may be laminated via adhesive layers. The slow axis refers to a direction in which a refractive index becomes maximum.

It is preferable that the absorptive polarizer and the second phase difference layer are brought into direct contact with each other or may be laminated via adhesive layers.

With respect to the optical film according to the invention, an absorptive polarizer, a second phase difference layer, and a circular polarization reflection layers are brought into direct contact with each other so as to be laminated. Examples of the method of bring these members into direct contact with each other so as to be laminated include a method of coating respective members with another member so as to be laminated.

According to the invention, the expression "adhesion" is used as a concept of also including a "pressure sensitive adhesion". The pressure sensitive adhesive for forming the pressure sensitive adhesive layer is not particularly limited.

Adhesives using an acrylic polymer, a silicone-based polymer, polyester, polyurethane, polyamide, polyether, and a fluorine-based or rubber-based polymer, as a base polymer can be appropriately selected to be used. Examples of the adhesive include a boron compound aqueous solution, a curable adhesive of an epoxy compound not including an aromatic ring in a molecule as disclosed in JP2004-245925A, an active energy ray hardening-type adhesive includes a photopolymerization initiator of which a molar light absorption coefficient at a wavelength of 360 to 450 nm is 400 or greater and an ultraviolet curable compound as essential components disclosed in JP2008-174667A, and an active energy ray hardening-type adhesive containing (a) a (meth)acrylic compound having two or more (meth)acryloyl groups in a molecule, (b) a (meth)acrylic compound having only one polymerizable double bond and having a hydroxyl group in a molecule, and (c) phenol ethylene oxide-modified acrylate or nonyl phenol ethylene oxide-modified acrylate in 100 parts by mass which is a total amount of the (meth) acrylic compound disclosed in JP2008-174667A.

Polarizing plate protective films may be on one side or both sides of the absorptive polarizer.

(Polarizing Plate Protective Film)

As the polarizing plate protective film, films including well-known resins such as a cellulose-based resin, an acrylic resin, and a cyclic polyolefin resin can be used.

The thickness of the polarizing plate protective film is about 1 to 80 µm generally in view of strength, workability such as handleability, and film thickness reduction. Particularly, the thickness thereof is preferably 1 to 60 µm, more preferably 5 to 40 µm, and even more preferably 5 to 25 µm.

<Method of Producing Optical Film>

A method of producing the optical film according to the invention is not particularly limited, and examples thereof include well-known methods.

(Rubbing Treatment)

In a case where the second phase difference layer includes a disc-like liquid crystal compound, and it is preferable that the surface of the alignment film is subjected to a rubbing treatment before the second phase difference layer is formed.

As the rubbing treatment described above, treatment methods that are widely employed as liquid crystal alignment treatment processes of LCD can be applied. That is, a method of obtaining the alignment by rubbing the surface of the alignment film in a constant direction by using paper, gauze, felt, rubber, nylon fibers, or polyester fibers can be used. Generally, the method is performed by performing rubbing several times by using cloth in which fibers having uniform lengths and uniform thicknesses are averagely implanted.

It is preferable to align molecules of the liquid crystal compound by coating the rubbing treatment surface of the alignment film with the composition. Thereafter, if necessary, the circular polarization reflection layer can be formed by reacting an alignment film polymer and a polyfunctional monomer included in an optically anisotropic layer or crosslinking alignment film polymers by using a crosslinking agent.

(Solvent)

As a solvent of a coating liquid that is a liquid crystal composition for forming the second phase difference layer or the circular polarization reflection layer, an organic solvent is preferably used. Examples of the organic solvent include amide (for example, N,N-dimethylformamide), sulfoxide (for example, dimethylsulfoxide), heterocyclic compounds (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxyethane). Alkyl halide and ketone are preferable. Two or more types of organic solvents may be used together.

Coating of the liquid crystal composition can be performed by spreading liquid material such as a solution obtained by using a solvent or melt obtained by heating in an appropriate method such as a roll coating method, a gravure printing method, or a spin coating method.

A preferable range of the coating thickness (in a case of a solution, a coating thickness after a solvent is dried) of the liquid crystal composition described above in a coating step is the same as the preferable range of the thicknesses of the second phase difference layer or the circular polarization reflection layer.

A method of forming the circular polarization reflection layer is not particularly limited. However, examples thereof include a method of directly coating an underlayer with a coating liquid for a circular polarization reflection layer obtained by fixing cholesteric alignment of the rod-like liquid crystal compounds including liquid crystal compounds.

The liquid crystal composition that becomes a coated film by being applied to a surface is preferably caused to be a state of cholesteric alignment (cholesteric liquid crystalline phase). In an aspect in which the liquid crystal composition is prepared as a coating liquid including a solvent, the solvent is removed by drying the coated film, such that the state of the cholesteric alignment can be obtained in some cases. In order to obtain the transition temperature to the cholesteric alignment, the coated film may be heated, if desired. For example, the coated film is once heated to a temperature of an isotropic phase and thereafter is cooled to a cholesteric liquid crystalline phase transition temperature, such that the state of the cholesteric alignment can be stably obtained. In view of the production suitability, the liquid crystalline phase transition temperature of the liquid crystal composition is preferably in the range of 10° C. to 250° C. and more preferably in the range of 10° C. to 150° C. If the temperature is 10° C. or higher, the temperature is not decreased to the temperature range exhibiting the liquid crystalline phase, and thus a cooling step is not required. If the temperature is 250° C. or lower, an isotropic liquid state having the temperature higher than the temperature range exhibiting the liquid crystalline phase is not formed, and thus the high temperature is not required, and the temperature range is preferable in view of suppressing waste of thermal energy, deformation of a substrate, alteration, and the like.

Subsequently, it is preferable to form the circular polarization reflection layer obtained by fixing the cholesteric alignment of the liquid crystal compound and fixing the cholesteric alignment of the rod-like liquid crystal compound.

It is preferable that the rod-like liquid crystal compound is fixed by maintaining the alignment state. The fixation is preferably performed by polymerization reaction of the polymerizable group that is introduced to the rod-like liquid crystal compound.

It is preferable to include a step of performing ultraviolet irradiation on the coated surface side of the liquid crystal composition. Hardening reaction can be performed by irradiating the coated film in the state of the cholesteric alignment with ultraviolet light. In this step, it is preferable that the hardening reaction of the liquid crystal composition proceeds by irradiation of the ultraviolet light, the cholesteric alignment is fixed, and the circular polarization reflection layer is formed.

The ultraviolet irradiation amount is preferably 1 to 400 mJ/cm$^2$.

The ultraviolet illuminance is preferably 0.1 to 50 mW/cm$^2$.

The temperature at the time of the irradiation of the ultraviolet light may be a liquid crystal temperature or higher. Generally, 140° C. or lower is generally suitable. Specifically, the temperature is preferably in the range of 60° C. to 140° C. and suitably 80° C. to 120° C. There is an effect of promoting the diffusion speed of monomer components by heating. If the temperature is 60° C., the diffusion speed of the liquid crystal compound becomes fast, so as to reduce the ultraviolet irradiation time.

The direction of the revolution of the cholesteric alignment (liquid crystalline phase) can be adjusted depending on types of liquid crystals or types of the chiral agent to be added, and the helical pitch (that is, selective reflection wavelength) can be adjusted by the concentration of these materials. The reflected wavelengths in specific areas of the respective circular polarization reflection layers are shifted depending on various factors of the production methods. The wavelengths can be shifted by the temperature, the illuminance, irradiation time, or the like, at the time of fixing the cholesteric alignment, in addition to concentrations of adding chiral agents.

In the above step, the cholesteric alignment is fixed, and the circular polarization reflection layer is formed. Here, as the state of "fixation" of the liquid crystalline phase, a state in which alignment of the liquid crystal compound that is the cholesteric alignment is maintained is a most typical and preferred aspect. The state is not limited thereto, and specifically, the state means a state in which a fixation alignment form can be stably maintained generally in the temperature range of 0° C. to 50° C., and in a more severe condition in the temperature range of −30° C. to 70° C., without fluidity in the layer and without generating changes in the alignment form. According to the invention, it is preferable to fix an alignment state as the cholesteric alignment by hardening reaction that progresses due to the ultraviolet light irradiation.

According to the invention, it is sufficient that optical properties of the cholesteric alignment are maintained in the layer, and finally the liquid crystal composition in the circular polarization reflection layer is not required to exhibit liquid crystallinity in advance. For example, the liquid crystal composition may be caused to have a high molecular weight by hardening reaction and may lose liquid crystallinity already.

A method of producing of the circular polarization reflection layer obtained by fixing the cholesteric alignment is not particularly limited, without departing from the gist of the invention. For example, among the methods disclosed in JP1989-133003A (JP-H01-133003A), JP3416302B, JP3363565B, and JP1996-271731A (JP-H08-271731A), methods that do not depart from the gist of the invention can be used and the contents of the publications are incorporated to the invention.

[Illumination Device]

The illumination device according to the invention has a light source and the optical film according to the invention.

The illumination device according to the invention is arranged on the side of the light source opposite to the optical film and preferably has a reflection member that converts the polarization state of the light that is emitted from the light source and is reflected on the optical film and reflects light.

In the illumination device according to the invention, the light source preferably emits blue light, green light, and red light.

The illumination device according to the invention can be used in a backlight unit of the image display device or in a portion thereof.

As the illumination device, an aspect in which the optical film according to the invention is incorporated to surface light sources disclosed in JP2008-250333A or illumination devices disclosed in [0085] to [0093] of JP2003-279739A is preferable, and surface light sources disclosed in JP2008-250333A and illumination devices disclosed in [0085] to [0093] of JP2003-279739A are incorporated to this specification.

<Backlight Unit>

The configuration of the backlight may be an edge light mode using a light guide plate, a reflection plate, or the like as a configuration member or may be a direct backlight mode. However, it is preferable that the backlight unit includes a reflection member that converts the polarization state of the light that is emitted from the light source and is reflected on the optical film and reflects light on a rear portion of the light source. The reflection member is not particularly limited, and well-known reflection members can be used. Particularly, the reflection members are disclosed in JP3416302B, JP3363565B, JP4091978B, JP3448626B, and the like, and contents of the publications are incorporated to the invention.

According to the invention, the light source of the backlight preferably has a blue light emitting diode that emits the blue light and a fluorescence material that emits the green light and the red light when the blue light is incident on the blue light emitting diode.

The light source of the backlight may use a blue light emitting diode that emits the blue light, a green light emitting diode that emits the green light, and a red light emitting diode that emits the red light.

Examples of the fluorescence material include yttrium.aluminum.garnet-based yellow phosphors and terbium.aluminum.garnet-based yellow phosphors. A fluorescence wavelength of the fluorescence material can be controlled by changing particle diameters of the phosphors.

In the image display device, a blue light emitting diode that emits the blue light and a fluorescence material that emits the green light and the red light when the blue light of the blue light emitting diode is incident is a quantum dot member (for example, a quantum dot sheet and a bar-like quantum dot bar), and the quantum dot member is preferably arranged between the optical film and the blue light source. The quantum dot member is not particularly limited, and well-known quantum dot members can be used. For example, quantum dot members are disclosed in JP2012-169271A and SID'12 DIGEST p. 895, and the contents thereof are incorporated to this specification. As the quantum dot sheet, a quantum dot enhancement film (QDEF, manufactured by NanoSys Co., Ltd.) can be used.

Preferable emission center wavelengths of the light in respective colors emitted by the backlight unit are as follows. The blue light preferably has an emission center wavelength in a wavelength range of 440 to 470 nm. The green light preferably has an emission center wavelength in a wavelength range of 520 to 570 nm. The red light preferably has an emission center wavelength in a wavelength range of 600 to 640 nm.

All of the half-widths of the blue light, the green light, and the red light all preferably 100 nm or less.

The blue light emitted by the backlight unit preferably has an emission intensity peak of which a half-width is 80 nm or less, more preferably has an emission intensity peak of which a half-width is 70 nm or less, and particularly preferably has an emission intensity peak of which a half-width is 30 nm or less.

The green light emitted by the backlight unit preferably has an emission intensity peak of which a half-width is 80 nm or less, more preferably has an emission intensity peak of which a half-width is 70 nm or less, and particularly preferably has an emission intensity peak of which a half-width is 60 nm or less.

The red light emitted by the backlight unit preferably has an emission intensity peak of which a half-width is 80 nm or less, more preferably has an emission intensity peak of which a half-width is 70 nm or less, and particularly preferably has an emission intensity peak of which a half-width is 60 nm or less.

The difference (center wavelength of reflection band-emission center wavelength) between the emission center wavelength (a wavelength at which an emission intensity peak is formed) of blue light, green light, and red light of the backlight unit and center wavelengths (wavelength at which a peak of reflection ratios is formed) of the reflection band of the circular polarization reflection layer in respective colors in the optical film is preferably within ±50 nm and more preferably within ±25 nm with respect to the blue light and the green light.

Meanwhile, with respect to the red light, the difference (center wavelength of reflection band-emission center wavelength) from the center wavelength (wavelength at which a peak of reflection ratios is formed) of the reflection bands of the circular polarization reflection layers in respective colors in the optical film is preferably 0 to 75 nm, more preferably 0 to 50 nm, and even more preferably 10 to 30 nm in view of suppressing oblique tint changes.

In addition, the backlight unit preferably has a diffusion plate, a diffusion sheet, a prism sheet (for example, BEF), and a light guide, which are well-known in the art. Other members are also disclosed in JP3416302B, JP3363565B, JP4091978B, and JP3448626B.

[Image Display Device]

The image display device according to the invention has the optical film according to the invention or the illumination device according to the invention.

<Liquid Crystal Display Device>

The image display device according to the invention preferably has liquid crystal cells. An image display device having liquid crystal cells is also referred to as a liquid crystal display device.

The liquid crystal display device generally has a configuration in which a backlight (in this specification, also referred to as BL) unit, a backlight side polarizing plate, a liquid crystal cell, a viewing side polarizing plate, and the like are provided in this order, and the optical film according to the invention is preferably used by being integrated with the backlight side polarizing plate.

It is preferable that the liquid crystal display device has liquid crystal cells, the optical film according to the invention, and a backlight unit, in this order;

the backlight unit includes light sources that emit blue light, green light, and red light; and the backlight unit includes a reflection member that converts the polarization states of light that is emitted from the light source and is reflected on the optical film and reflects light on a rear portion of the light source. It is more preferable that this liquid crystal display device includes blue light having an emission center wavelength at a wavelength range of 430 to 480 nm, green light having an emission center wavelength at a wavelength range of 500 to 600 nm, and a light source that emits red light having at least a portion of emission intensity peaks at a wavelength range of 600 to 700 nm; and the backlight unit includes a reflection member that converts a polarization state of light reflected on the optical film emitted from the light source and reflects light on a rear portion of the light source.

In the image display device according to the invention, it is preferable that both half-widths of the blue light and the green light are 100 nm or less. In the image display device according to the invention, it is preferable that the red light has an emission center wavelength in a wavelength range of 600 to 700 nm, and a half-width of the red light is 100 nm or less. In this aspect which is a portion of the image display device according to the invention, if RGB (R is red, G is green, and B is blue) narrow band backlight is incorporated, color reproducibility is improved, and sufficient intensity of oblique light can be realized by the optical film according to the invention having a simple configuration of circular polarization reflection layers in red, green, and blue and a first phase difference layer.

In the image display device according to the invention, the backlight unit preferably has a wavelength selective filter for a blue color that selectively penetrates light having a wavelength shorter than 460 nm among the blue light.

In the image display device according to the invention, the backlight unit preferably has a wavelength selective filter for a red color that selectively penetrates light having a wavelength longer than 630 nm among the red light.

The wavelength selective filter for a blue color and the wavelength selective filter for a red color are not particularly limited, and well-known filters can be used. The filters are disclosed in JP2008-52067A.

As the image display device, aspects in which the optical film or the illumination device according to the invention are incorporated to liquid crystal display devices disclosed in JP2008-250333A and liquid crystal display devices disclosed in [0083] to [0084] of JP2003-279739A are preferable, and liquid crystal display devices disclosed in JP2008-250333A and liquid crystal display devices disclosed in [0083] to [0084] of JP2003-279739A are incorporated to this specification.

EXAMPLES

With reference to examples and comparative examples, characteristics of the invention are more specifically described below. Materials, amounts used, ratios, treatment details, treatment orders, and the like represented in examples below can be appropriately changed without departing from the gist of the invention. Therefore, the scope of the invention should not be construed in a manner of being limited to specific examples below.

[Preparation of Members]

<Preparation of Backlight Side Polarizing Plate>

(Production of Polarizing Plate Z)

As the front-side polarizing plate protective film of the backlight side polarizing plate, a commercially available cellulose acylate-based film "TD60" (manufactured by Fujifilm Corporation) was prepared.

As a rear-side polarizing plate protective film of the backlight side polarizing plate, a commercially available cellulose acylate-based film "TD60" (manufactured by Fujifilm Corporation) was used.

An absorptive polarizer was produced in the same manner as [0219] to [0220] of JP2006-293275A and the retardation film and the polarizing plate protective film are bonded on both sides of the absorptive polarizer, so as to produce a polarizing plate Z.

<Production of λ/4 Plate A>

With reference to JP2012-108471A, a layer (a RLC liquid crystal layer having horizontal alignment) obtained by fixing horizontal alignment of rod-like liquid crystal (also referred to as RLC; rod liquid crystal) compounds on a commercially available cellulose acylate-based film "TD60" (manufactured by Fujifilm Corporation) used as a support was used, so as to produce a λ/4 plate A. The cellulose acylate-based film "TD60" is referred to as a support (TAC). For example, Re (450) of the obtained λ/4 plate A was 140 nm, Re (550) was 128 nm, Re (630) was 123 nm, and the thickness of a liquid crystal layer was about 0.8 μm and about 60 μm including the support (TAC). A difference between the front surface Re of the obtained λ/4 plate A and Re at an azimuthal angle of 45 degrees and a polar angle of 60° was 5 nm at a wavelength of 550 nm.

<Production of λ/4 Plate B>

In the same manner as the method of producing the rod-like liquid crystal λ/4 plate A except for not performing a saponification treatment on the commercially available cellulose acylate-based film, a λ/4 plate B having a layer (liquid crystal layer) obtained by fixing horizontal alignment of the rod-like liquid crystal compound on the support (TAC) was produced. Re (450) of the obtained λ/4 plate B was 140 nm, Re (550) was 128 nm, and Re (630) was 123 nm, the thickness of a liquid crystal layer was about 0.8 μm and about 60 μm including the support (TAC). A difference between a front surface Re of the obtained λ/4 plate B and Re at an azimuthal angle of 45 degrees and a polar angle of 60° was 5 nm at a wavelength of 550 nm.

<Production of λ/4 Plate C>

POVAL PVA-103 manufactured by Kuraray Co., Ltd. was dissolved in pure water. The concentration and the coating amount of the solution were adjusted such that the dry film thickness became 0.5 μm, and bar coating was performed on the commercially available cellulose acylate-based film "TD60" (manufactured by Fujifilm Corporation). Thereafter, the coated film was heated at 100° C. for five minutes. Further, the surface was subjected to a rubbing treatment so as to obtain an alignment layer.

Subsequently, the solute having the composition below was dissolved in methyl ethyl ketone (MEK), so as to prepare a coating liquid. With respect to the coating liquid, the concentration and the coating amount were adjusted such that the dry film thickness became 1 μm, and bar coating was performed on the alignment layer. Thereafter, the solvent was maintained at 85° C. for two minutes, the solvent was vaporized, heat aging was performed at 100° C. for four minutes, an even alignment state was obtained. The disc-like compound was vertically aligned with respect to the support plane.

Thereafter, this coated film was maintained at 80° C., this is irradiated with ultraviolet light by using a high pressure mercury lamp under a nitrogen atmosphere, so as to produce a λ/4 plate C obtained by fixing alignment of disc-like liquid crystal compounds on the support (TAC).

The retardation of the λ/4 plate C was measured by using an automatic birefringence determination device KOBRA-21SDH (manufactured by Oji Scientific Instruments), and it was checked that retardation at wavelengths λ=450 nm, 550 nm, and 650 nm was respectively 139 nm, 129 nm, and 124 nm, and the λ/4 plate C was a λ/4 plate at these wavelength ranges. The difference between the front surface Re of the obtained λ/4 plate C and Re at an azimuthal angle of 45 degrees and a polar angle of 60° was 10 nm at a wavelength 550 nm.

| (Solute composition of coating liquid for producing λ/4 plate C) | |
|---|---|
| Disc-like liquid crystal compound 1 | 35 parts by mass |
| Disc-like liquid crystal compound 2 | 35 parts by mass |
| Alignment assistant agent (compound 3) | 1 parts by mass |
| Alignment assistant agent (compound 4) | 1 parts by mass |
| Polymerization initiator (compound 5) | 3 parts by mass | compound 1

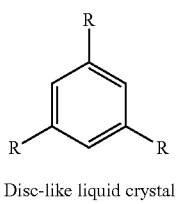

Disc-like liquid crystal

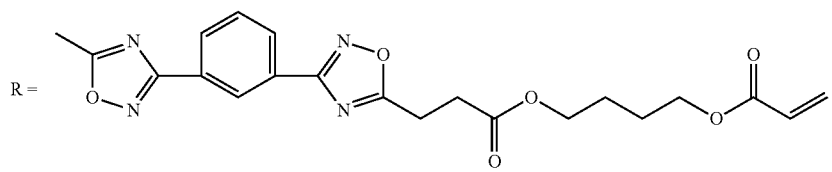

-continued

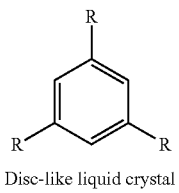
Disc-like liquid crystal compound 2

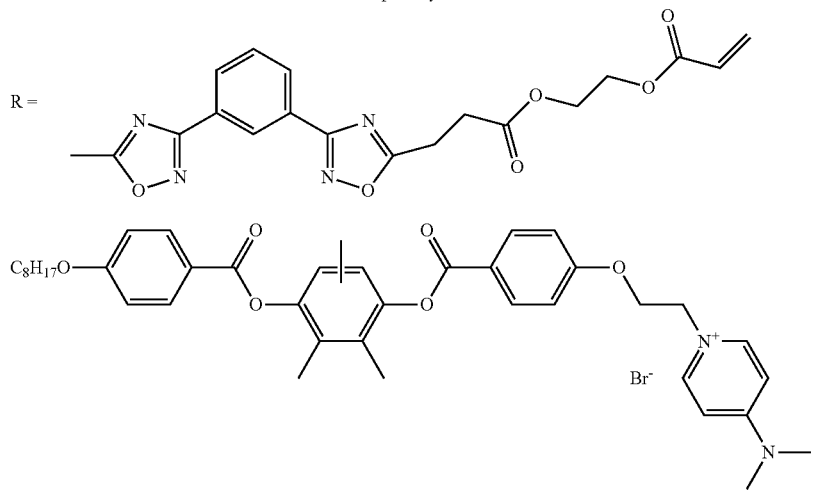

Compound 3

(In the structural formula below, mixture of two types of compounds of which substitution positions of methyl groups in trimethyl-substituted benzene rings were different from each other; mixture ratio of the two types of compounds was 50:50 (mass ratio))

Compound 4

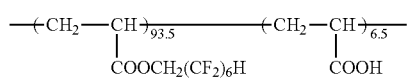

(In the structural formula, the ratio was mass ratio)

Compound 5

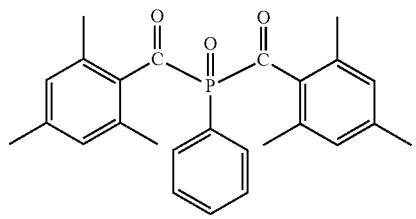

<Production of λ/4 Plate D>

A norbornene resin (product name: ZEONOR1420, manufactured by Zeon Corporation, Tg=136° C.) was used as the material having a positive intrinsic birefringence value, and a styrene-maleic anhydride copolymer (product name: DYLARK D332, manufactured by NOVA Chemicals Corporation, Tg=131° C.) was used as the material having a negative intrinsic birefringence value, so as to obtain a laminate having a three layer structure in the same manner as a phase difference layer H1 described below. Thickness unevenness of the laminate was measured by a scanning thickness gauge. The measurement was performed by continuous scanning the laminate in a longitudinal direction. The obtained laminate had a thickness average of 120 μm and the thickness unevenness was 2.2% with respect to a thickness average described above.

Subsequently, the laminate was stretched by 1.7 times, by a vertical uniaxial stretching device at 125° C.

With respect to the laminate after stretching, the retardation was measured by using an automatic birefringence determination device KOBRA-21SDH (manufactured by Oji Scientific Instruments), and a λ/4 plate D (support λ/4 plate D) of which ratios of retardation at wavelengths λ=450 nm, 550 nm, and 650 nm and the wavelengths were respectively 0.235, 0.250, and 0.232 was able to be obtained. A difference between a front surface Re of the obtained λ/4 plate D and Re at an azimuthal angle of 45 degrees and a polar angle of 60° was 2 nm at a wavelength of 550 nm.

<Production of Phase Difference Layer H1 and Phase Difference Layer H2>

With reference to JP2012-108471A, an RLC positive C-plate was formed by using a UV curable rod-like liquid crystal compound on a commercially available cellulose acylate-based film "TD60" (manufactured by Fujifilm Corporation). Re (550) of the formed positive C-plate was ≤1 nm, Rth (550) was −400 nm, and the thickness of a layer obtained by fixing vertical alignment of the rod-like liquid crystal compound was about 4 μm and was about 60 μm including the support (TAC). The formed positive C-plate was set as the phase difference layer H1.

In the same manner except for causing the film thickness to be 6 μm, a positive C-plate having Re (550) of ≤1 nm and Rth (550) of −600 nm was produced and set as a phase difference layer H2.

<Production of Phase Difference Layer I>

A styrene-maleic anhydride copolymer ("DYLARK D332", manufactured by NOVA Chemicals Corporation, Tg=131° C.) was used as a material having a negative intrinsic birefringence value, and a norbornene resin (product name: ZEONOR 1020, manufactured by Zeon Corporation, Tg=105° C.) was used as a transparent resin material. First, a norbornene resin and a styrene-maleic anhydride copolymer in a melted state were respectively stored in respective extruders of an extrusion die in which two extruders were integrally incorporated into the extrusion die. An extrusion flow path of an extruder in which the norbornene resin was stored was branched into two, and the norbornene resin extruded from the branched flow path sandwiches the styrene-maleic anhydride copolymer extruded from the other extruder, such that a laminate of a three-layer configuration was formed in the extrusion die. Filters were arranged in connecting holes to the extrusion die having the two extruders, and the norbornene resin and the styrene-maleic anhydride copolymer passed through the filters and extruded to the inside of the extrusion die, so as to obtain a laminate having a three-layer structure. The thickness unevenness of the laminate was measured by using a scanning thickness gauge. The measurement was performed by continuously scanning the laminate in the longitudinal direction. The obtained laminate had a thickness average of 300 μm and the thickness unevenness was 2.5% with respect to the thickness average.

Subsequently, this laminate was sequentially sent to a uniaxial stretching device and a tenter stretching (uniaxial stretching in a cross direction which is perpendicular to a transportation direction) device in a vertical direction parallel to the transportation direction of zone heating and sequential biaxial stretching was performed in order, so as to produce the phase difference layer I. The stretching temperature was 140° C. in both of the vertical direction stretching and cross-direction stretching, and the stretching ratio was 1.8 times in vertical direction stretching and 1.5 times in cross-direction stretching.

The average thickness of the obtained phase difference layer I was 160 μm. A refractive index and retardation of the phase difference layer I were measured by using an automatic birefringence determination device KOBRA-21SDH (manufactured by Oji Scientific Instruments), and the refractive index in the in-plane direction was nx=1.5732 and ny=1.5731, and the refractive index in the thickness direction was nz=1.5757. In the retardation of the phase difference layer I, Re was 10 nm, and Rth was −400 nm.

<Forming of Light Reflecting Layer R>

With reference to Fuji Film Research & Development No. 50 (2005) pp. 60 to 63, a light reflecting layer R (liquid crystal layer) obtained by changing an addition amount of the chiral agent by using liquid crystals having Δn of 0.16, and fixing a cholesteric liquid crystalline phase of which a center wavelength of the reflection band was 650 nm and a half-width thereof was 70 nm was formed on a polarizing plate protective film (commercially available cellulose acylate-based film "TD60" (manufactured by Fujifilm Corporation)). The polarizing plate protective film used was Re=1 nm and Rth=38 nm, and thus there were some polarizing plate protective film that did not have functions as λ/4 plates in a wavelength range of 380 to 760 nm.

The total thickness of the obtained light reflecting layer R was about 65 μm including the polarizing plate protective film.

<Forming of Light Reflecting Layer G>

In the same manner as the forming of the light reflecting layer R except for changing an addition amount of the chiral agent, the light reflecting layer G (liquid crystal layer) was formed by fixing a cholesteric liquid crystalline phase of which a center wavelength of the reflection band was 550 nm and a half-width thereof was 60 nm. The polarizing plate protective film used was Re=1 nm and Rth=38 nm, and thus there were some polarizing plate protective film that did not have functions as λ/4 plates at a wavelength range of 380 to 760 nm.

The total thickness of the obtained light reflecting layer G was about 65 μm including the polarizing plate protective film.

<Forming of Light Reflecting Layer B>

In the same manner as the forming of the light reflecting layer R except for changing the addition amount of the chiral agent, a light reflecting layer G (liquid crystal layer) was formed by fixing a cholesteric liquid crystalline phase at a center wavelength of the reflection band was 450 nm and a half-width thereof was 50 nm. The polarizing plate protective film used, Re=1 nm and Rth=38 nm were satisfied, and thus there were some polarizing plate protective film that did not have functions as λ/4 plates in a wavelength range of 380 to 760 nm.

The total thickness of the obtained light reflecting layer B was about 65 μm including the polarizing plate protective film.

<Forming of Light Reflecting Layer PG>

First, a terminal fluorinated alkyl group-containing polymer (compound A) having an optically active site disclosed in [0065] of JP4570377B was obtained. Specifically, the compound A was obtained as follows.

50 parts by mass of a fluorine-based solvent AK-225 (manufactured by Asahi Glass Co., Ltd., a mixture solvent in which 1,1,1,2,2-pentafluoro-3,3-dichloropropane: 1,1,2,2,3-pentafluoro-1,3-dichloropropane=1:1.35 (molar ratio)) and 5.22 parts by mass of a reactive chiral agent having optical activity in the structure below (Compound 7, * represents an optically active site in the formula) were put into a four-necked flask including a condenser, a thermometer, a stirrer, and a dropping funnel, the temperature of the reaction vessel was adjusted to 45° C., and subsequently 6.58 parts by mass of a 10 mass % solution of diperfluoro-2-methyl-3-oxa-hexanoyl peroxide/AK225 was added dropwise over five minutes. After the dropwise addition was completed, reaction was performed in a nitrogen stream at 45° C. for five hours, the product was concentrated to 5 ml, reprecipitation was performed with hexane, and drying was performed, so as to obtain 3.5 parts by mass of a terminal fluorinated alkyl group-containing polymer having an optically active site (compound A) (yield: 60%).

A molecular weight of the obtained polymer was measured by using GPC and using tetrahydrofuran (THF) as a developing solvent, and Mn=4,000 (Mw/Mn=1.77) was satisfied. A fluorine content was measured, and the fluorine content was 5.89 mass %.

Compound 7

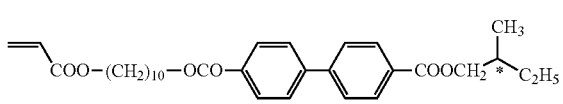

One surface of glass 7059 manufactured by Corning Incorporated was coated with an alignment film coating liquid consisting of 10 parts by mass of polyvinyl alcohol and 371 parts by mass of water and the alignment film coating liquid was dried, so as to form an alignment film having a thickness of 1 μm. Subsequently, a rubbing treatment was continuously performed on an alignment film in a parallel direction to the longitudinal direction of the glass.

The alignment film was coated with the composition in the composition below by using a bar coater, the composition was dried for 10 seconds at room temperature, heating (alignment maturing) was performed for two minutes in an oven at 100° C., and ultraviolet light irradiation was performed for 30 seconds, so as to produce a light reflecting layer PG having a layer (liquid crystal layer) (A) obtained by fixing a cholesteric liquid crystalline phase having a thickness of 5.0 μm.

| (Composition for forming the layer (A) obtained by fixing cholesteric liquid crystalline phase) | |
|---|---|
| Compound 8 | 8.2 parts by mass |
| Compound 9 | 0.3 parts by mass |
| Subsequently, terminal fluorinated alkyl group-containing polymer (Compound A) having an optically active site prepared in advance | 1.9 parts by mass |
| Methyl ethyl ketone | 24.0 parts by mass |

A cross section of the layer (A) obtained by fixing a cholesteric liquid crystalline phase was observed with a scanning electron microscope and had a structure in which a helical axis is included in a layer normal direction and pitches of the layer (A) obtained by fixing a cholesteric liquid crystalline phase were continuously changed. Here, with respect to the pitches of the layer (A) obtained by fixing a cholesteric liquid crystalline phase, when a cross section of the layer obtained by fixing a cholesteric liquid crystalline phase was observed with a scanning electron microscope, a width of a layer having two times of the repetition of bright portions and dark portions (bright portion, dark portion, bright portion, and dark portion) in the normal direction was counted by one pitch.

If a short wavelength side of the layer (A) obtained by fixing a cholesteric liquid crystalline phase in a pitch thickness direction was defined as an x plane, and a short wavelength side thereof was defined as a y plane, cholesteric pitches of the light reflecting layer PG by using AXOSCAN manufactured by Axometrics, Inc. AXOMETRIX were measured. As a result, a center wavelength of a cholesteric reflection band near the x plane side was 410 nm, and a center wavelength of a cholesteric reflection band near the y plane side was 620 nm.

Though it is not employed in this example, even if a long cellulose acylate film (TD80UL, manufactured by Fujifilm Corporation) of 100 meters or longer was used instead of glass 7059 manufactured by Corning Incorporated, the same light reflecting layer PG having the layer (A) obtained by fixing a cholesteric liquid crystalline phase can be obtained. If a long cellulose acylate film is used, it is possible to produce a roll-to-roll optical film and thus it is preferable in view of production suitability. The long film used is not limited thereto, as long as the long film can transfer the cholesteric liquid crystal layer.

<Preparation of Viewing Side Polarizing Plate>
(Production of Polarizing Plate A)
In the same manner as the forming of the polarizing plate Z except for using the λ/4 plate A in which a rod-like liquid crystal compound was used as the rear-side polarizing plate protective film, a polarizing plate A was produced.
(Production of Polarizing Plate C)
In the same manner as the forming of the polarizing plate Z except for using the λ/4 plate C in which a disc-like liquid crystal compound was used as a rear-side polarizing plate protective film, a polarizing plate C was produced.
(Production of Polarizing Plate Y)
In the same manner as the forming of the polarizing plate Z except for using the λ/4 plate B in which a rod-like liquid crystal compound was used instead of the rear-side polarizing plate protective film, the polarizing plate Y was produced. Only a liquid crystal layer was bonded to the λ/4 plate B, and the support portion was removed after the transfer and was not used.

Examples 1 to 6, and 8, and Comparative Examples 1 to 3

<Production of Optical Film>
Any one of the polarizing plate Z, the polarizing plate A, the polarizing plate C, and the polarizing plate Y including the absorptive polarizers obtained by the above methods, any one of the λ/4 plate A, the λ/4 plate B, the λ/4 plate C, and the λ/4 plate D which were second phase difference layers, the light reflecting layer R, the light reflecting layer G, the light reflecting layer B, and the light reflecting layer PG which were the circular polarization reflection layers presented in Table 3 below, and the phase difference layer H1 and the phase difference layer I which were first phase difference layers were bonded to each other via adhesive layers using acrylic adhesives in a refractive index of 1.47. Only liquid crystal layers were bonded to the light reflecting layer R, the light reflecting layer G, the light reflecting layer B, the light reflecting layer PG, and the phase difference layer H1, and the support portion was removed after transfer and was not used. Configurations of the optical films in the examples and the comparative examples which are polarizing plates with luminance enhancement films produced in the methods above are presented in Table 3 below. In Table 3 below, incidence ray sides to the optical films were set as members on the lower sides in Table 3, outgoing light sides from the optical films are set as members on the upper sides in Table 3, and optical films are presented in an order of being penetrated by light. For convenience of explanation, in Table 3 below, the respective circular polarization reflection layers are described as the first circular polarization reflection layer, the second circular polarization reflection layer, and the third circular polarization reflection layer, in an order from the outgoing light side from the optical films.

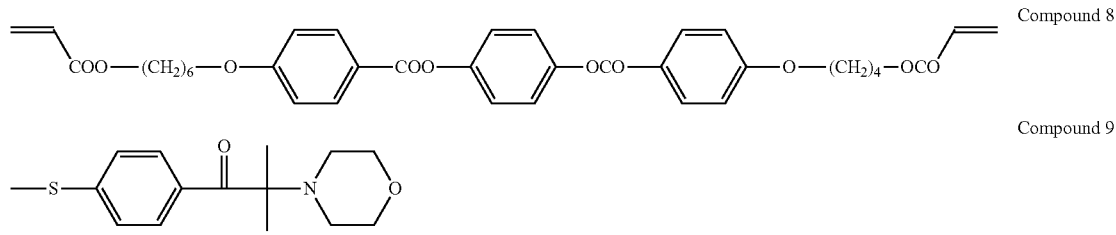

An angle formed by slow axis direction of (λ/4 plate) which was the second phase difference layer and the transmission axis direction of the absorptive polarizer was −45° (135°). That is, an angle formed by the slow axis direction of (λ/4 plate) which was the second phase difference layer and the absorption axis direction of the absorptive polarizer was 45°.

Example 7

<Production of Protective Film J>

With reference to Fuji Film Research & Development No. 50 (2005) pp. 60 to 63, a first light reflecting layer obtained by changing an addition amount of the chiral agent by using liquid crystals having Δn of 0.16, and fixing a cholesteric liquid crystalline phase of which a center wavelength of the reflection band was 550 nm and a half-width thereof was 60 nm was formed on the λ/4 plate D produced above.

With reference to JP2012-108471A, a RLC positive C-plate was formed thereon by using UV curable rod-like liquid crystals. The thickness of the liquid crystal layer which is the formed positive C-plate was about 4 μm, Re (550) was ≤1 nm, and Rth (550) was −400 nm. The formed positive C-plate was the same as the phase difference layer H1, and thus is presented as the phase difference layer H1 in the following Table 3.

With reference to Fuji Film Research & Development No. 50 (2005) pp. 60 to 63, the second and third light reflecting layers obtained by changing an addition amount of the chiral agent by using liquid crystals having Δn of 0.16 and fixing a cholesteric liquid crystalline phase was formed.

The center wavelength of the reflection band of the obtained second light reflecting layer was 650 nm, a half-width was 70 nm, and a film thickness was 2.5 μm.

A center wavelength of a reflection band of the obtained third light reflecting layer was 450 nm, a half-width was 50 nm, and a film thickness was 1.8 μm.

In this manner, a protective film J obtained by laminate coating the support λ/4 plate D with the first light reflecting layer, the phase difference layer H1, the second light reflecting layer, and the third light reflecting layer was produced.

<Production of Optical Film>

In the same manner as the forming of the polarizing plate Z except for using the protective film J as the rear-side polarizing plate protective film of the polarizing plate, the optical film of Example 7 which is a viewing side polarizing plate J was produced. Configurations of the optical film of Example 7 are presented in Table 3 below.

Comparative Example 4

In the production of a light collecting element of Example 1 disclosed in JP2008-250333A, an optical film of Comparative Example 4 was produced.

The film of Comparative Example 4 had a configuration in which, in an order from the light incident side, glass, a circular polarization reflection layer obtained by fixing a cholesteric liquid crystalline phase of a rod-like liquid crystal compound of which a center wavelength of a reflection band was 440 nm, a circular polarization reflection layer obtained by fixing a cholesteric liquid crystalline phase of a rod-like liquid crystal compound of which a center wavelength of a reflection band was 550 nm, a circular polarization reflection layer obtained by fixing a cholesteric liquid crystalline phase of a rod-like liquid crystal compound of which a center wavelength of a reflection band was 610 nm, a negative C-plate, a circular polarization reflection layer obtained by fixing a cholesteric liquid crystalline phase of a rod-like liquid crystal compound of which a center wavelength of a reflection band was 610 nm, a circular polarization reflection layer obtained by fixing a cholesteric liquid crystalline phase of a rod-like liquid crystal compound of which a center wavelength of a reflection band was 550 nm, a circular polarization reflection layer obtained by fixing a cholesteric liquid crystalline phase of a rod-like liquid crystal compound of which a center wavelength of a reflection band was 440 nm, glass, a λ/4 plate which was also a film support, and an absorptive polarizer were laminated.

Comparative Example 5

According to Example 1 disclosed in JP2003-279739A, an optical film of Comparative Example 5 was produced.

The optical film of Comparative Example 5 had a configuration in which, in an order from the light incident side, a circular polarization reflection layer obtained by fixing a cholesteric liquid crystalline phase of the rod-like liquid crystal compound of which a center wavelength of a reflection band was 700 nm, a circular polarization reflection layer obtained by fixing a cholesteric liquid crystalline phase of a rod-like liquid crystal compound of which a center wavelength of a reflection band was 550 nm, a circular polarization reflection layer obtained by fixing a cholesteric liquid crystalline phase of a rod-like liquid crystal compound of which a center wavelength of a reflection band was 400 nm, a positive C-plate, a λ/4 plate which is also a film support, and an absorptive polarizer are laminated.

[Production and Evaluation of Liquid Crystal Display Device]

<Production of Liquid Crystal Display Device>

(Production of White LED Backlight Unit)

A commercially available liquid crystal display device (manufactured by Sharp Corporation, product name: LC-46W9) was disassembled, and liquid crystal display devices of respective examples and comparative examples were produced by using optical films of respective examples and comparative examples instead of the backlight side polarizing plate without changing a backlight unit.

The backlight light source of this liquid crystal display device had a blue light emission peak wavelength of 450 nm. One emission peak was shown in green to red ranges, a peak wavelength was 550 nm, and a half-width was 100 nm.

Even if white LED backlight having other emission spectrums was used by using other commercially available liquid crystal display devices, the same effect was able to be obtained.

<Oblique Tint Change>

The obtained liquid crystal display devices of respective examples and comparative examples were visually observed at all azimuthal angles in a polar angle 60° direction observed, and evaluated by the following standards. "5" and "4" were necessary in practice, and evaluation of "5" was preferable.

5: Tint change was small, and display performance was excellent.

4: Tint was somewhat changed, but there was no problem in performance.

3: Tint was changed and was somewhat unsatisfactory.

2: Tint was changed and was problematic.

1: Tint was greatly changed and was very problematic.

<Intensity of Oblique Light>

The intensity of oblique light of the obtained liquid crystal display devices of respective examples and comparative examples were measured in the method below.

The intensity of oblique light (oblique luminance) of the liquid crystal display devices was measured in a method of obtaining average luminance of all azimuthal angles in the polar angle 60° direction from the front surface disclosed in [0180] of JP2009-93166A.

The results were evaluated by the following standards. Evaluation of "5" or "4" was evaluation, and evaluation of "5" was more preferable.

5: Oblique luminance of the liquid crystal display device of Example 1 was 90% or greater, 4: oblique luminance of the liquid crystal display device of Example 1 was 70% or greater and less than 90%, 3: oblique luminance of the liquid crystal display device of Example 1 was 50% or greater and less than 70%, 2: oblique luminance of the liquid crystal display device of Example 1 was 30% or greater and less than 50%, and 1: oblique luminance of the liquid crystal display device of Example 1 was less than 30%.

Among the results of the evaluations below, results other than those of Comparative Examples 4 and 5 are presented in Table 3.

TABLE 3

| | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Viewing side (exit side of light from backlight) polarizing plate | Type | Polarizing plate Z | Polarizing plate A | Polarizing plate Y | Polarizing plate C | Polarizing plate C | Polarizing plate C | Polarizing plate J | Polarizing plate C | Polarizing plate A | Polarizing plate A | Polarizing plate A |
| | Front-side protective film | TD60 | TD60 | TD60 | TD60 | TD60 | TD60 | TD60 | TD60 | TD60 | TD60 | TD60 |
| | Polarizer | Absorptive polarizer | Absorptive polarizer | Absorptive polarizer | Absorptive polarizer | Absorptive polarizer | Absorptive polarizer | Absorptive polarizer | Absorptive polarizer | Absorptive polarizer | Absorptive polarizer | Absorptive polarizer |
| | Rear-side protective film | TD60 | None (λ/4 plate A was formed via adhesive layer) | None (λ/4 plate B was formed via adhesive layer) | None (λ/4 plate C was formed via adhesive layer) | None (λ/4 plate C was formed via adhesive layer) | None (λ/4 plate C was formed via adhesive layer) | None (Protective film J was directly formed without adhesive layer) | None (λ/4 plate C was formed via adhesive layer) | None (λ/4 plate A was formed via adhesive layer) | None (λ/4 plate A was formed via adhesive layer) | None (λ/4 plate A was formed via adhesive layer) |
| Second phase difference layer | Type | λ/4 plate A | λ/4 plate A | λ/4 plate B | λ/4 plate C | λ/4 plate C | λ/4 plate C | λ/4 plate D | λ/4 plate C | λ/4 plate A | λ/4 plate A | λ/4 plate A |
| | Material | Rod-like liquid crystal compound | Rod-like liquid crystal compound | Rod-like liquid crystal compound | Disc-like liquid crystal compound | Disc-like liquid crystal compound | Disc-like liquid crystal compound | Resin film | Disc-like liquid crystal compound | Rod-like liquid crystal compound | Rod-like liquid crystal compound | Rod-like liquid crystal compound |
| Phase difference between second phase difference layer and first circular polarization reflection layer | Type | None | None | None | None | None | None | None | None | None | Phase difference layer H1 | None |
| | Rth [nm] | — | — | — | — | — | — | — | — | — | −400 | — |
| First circular polarization reflection layer | Type | Light reflecting layer G | Light reflecting layer G | Light reflecting layer G | Light reflecting layer G | Light reflecting layer G | Light reflecting layer G | Light reflecting layer G | Light reflecting layer R | Light reflecting layer G | Light reflecting layer G | Light reflecting layer B |
| | Center wavelength [nm] | 550 | 550 | 550 | 550 | 550 | 550 | 550 | 650 | 550 | 550 | 450 |

TABLE 3-continued

|  |  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| First phase difference layer between first and second circular polarization reflection layers | Type | Phase difference layer H1 | Phase difference layer H1 | Phase difference layer H1 | Phase difference layer H1 | Phase difference layer I | Phase difference layer H2 | Phase difference layer H1 | Phase difference layer H1 | None | None | None |
|  | Rth [nm] | −400 | −400 | −400 | −400 | −400 | −600 | −400 | −400 | — | — | — |
| Second circular polarization reflection layer | Type | Light reflecting layer R | Light reflecting layer R | Light reflecting layer R | Light reflecting layer R | Light reflecting layer R | Light reflecting layer B | Light reflecting layer R | Light reflecting layer PG | Light reflecting layer R | Light reflecting layer R | Light reflecting layer R |
|  | Center wavelength [nm] | 650 | 650 | 650 | 650 | 650 | 450 | 650 | 510 | 650 | 650 | 650 |
| First phase difference layer between second and third circular polarization reflection layers | Type | None | None | None | None | None | None | None | None | None | None | Phase difference layer H1 |
|  | Rth [nm] | — | — | — | — | — | — | — | — | — | — | −400 |
| Third circular polarization reflection layer | Type | Light reflecting layer B | Light reflecting layer B | Light reflecting layer B | Light reflecting layer B | Light reflecting layer B | Light reflecting layer R | Light reflecting layer B | None | Light reflecting layer B | Light reflecting layer B | Light reflecting layer G |
|  | Center wavelength [nm] | 450 | 450 | 450 | 450 | 450 | 650 | 450 | None | 450 | 450 | 550 |
| Evaluation | Oblique tint change | 4 | 4 | 4 | 5 | 5 | 5 | 5 | 5 | 1 | 3 | 2 |
|  | Luminance of oblique light | 5 | 5 | 5 | 5 | 5 | 5 | 5 | 5 | 3 | 5 | 3 |

With reference to Table 3, it was understood that the oblique tint change was satisfactorily suppressed in the optical film according to the invention. In the preferred aspect of the optical film according to the invention, the intensity of oblique light was improved.

Meanwhile, in the optical film of the Comparative Example 1 not having the first phase difference layer, it was understood that the oblique tint change was not suppressed. It was understood that, in the optical film of Comparative Example 2 that did not have a first phase difference layer between circular polarization reflection layers and had the first phase difference layer on an outgoing light side of the laminate of the circular polarization reflection layer, the oblique tint change was not suppressed. It was understood that, in the optical film of Comparative Example 3 in which a circular polarization reflection layer arranged closest to the surface of the optical film on the light exit side was the blue light circular polarization reflection layer 14B of which a center wavelength of the reflection band was shortest among the circular polarization reflection layers, the oblique tint change was not suppressed.

Though configurations and evaluations were not presented in Table 3, in Comparative Example 4 using a light collecting element of Example 1 disclosed in JP2008-250333A, the evaluation of the oblique tint change was "3", and the intensity of oblique light was "1". Though configurations and evaluations were not presented in Table 3, in Comparative Example 5 using an optical film of Example 1 disclosed in JP2003-279739A, the evaluation of the oblique tint change was "3", and the intensity of oblique light was "3".

EXPLANATION OF REFERENCES

14R: red light circular polarization reflection layer
14G: circular polarization reflection layer that can reflect light in a green wavelength range
14B: circular polarization reflection layer that can reflect light in a blue wavelength range
14PG: circular polarization reflection layer that can reflect light in broadband wavelength ranges
21: first phase difference layer
22: second phase difference layer
31: absorptive polarizer

What is claimed is:

1. An optical film comprising:
at least two circular polarization reflection layers; and
a first phase difference layer,
wherein at least one circular polarization reflection layer is arranged on each of the both sides of the first phase difference layer,
center wavelengths of reflection bands of the circular polarization reflection layers arranged on both sides of the first phase difference layer are different from each other,
in a case where light incident from one surface of the optical film penetrates the first phase difference layer and the circular polarization reflection layers and exits from the other surface of the optical film, the circular polarization reflection layer arranged closest to a surface of the optical film on a light exit side is not the circular polarization reflection layer of which a center wavelength of a reflection band is shortest among the circular polarization reflection layers,
the first phase difference layer is a positive C-plate, and
center wavelengths of reflection bands of each circular polarization reflection layer arranged on one side of the first phase difference layer is different from center wavelengths of reflection bands of all circular polarization reflection layers arranged on the other side of the first phase difference layer.

2. The optical film according to claim 1, further comprising:
a second phase difference layer on the light exit side of the circular polarization reflection layer arranged closest to the surface of the optical film on a light exit side among the circular polarization reflection layers,
wherein retardation Re of the second phase difference layer in an in-plane direction is 100 to 180 nm.

3. The optical film according to claim 2,
wherein the second phase difference layer satisfies Expressions (A) to (C),
a difference between front surface Re of the second phase difference layer and Re at an azimuthal angle of 45 degrees and a polar angle of 60 degrees is −30 to 30 nm at a wavelength of 550 nm;

$$450 \text{ nm}/4-40 \text{ nm} < Re(450) < 450 \text{ nm}/4+40 \text{ nm} \qquad \text{Expression (A)}$$

$$550 \text{ nm}/4-40 \text{ nm} < Re(550) < 550 \text{ nm}/4+40 \text{ nm} \qquad \text{Expression (B)}$$

$$630 \text{ nm}/4-40 \text{ nm} < Re(630) < 630 \text{ nm}/4+40 \text{ nm} \qquad \text{Expression (C)}$$

in Expressions (A) to (C), Re (λ) represents retardation in an in-plane direction at a wavelength of λ nm, and a unit is nm.

4. The optical film according to claim 2, further comprising:
an absorptive polarizer on a light exit side of the second phase difference layer.

5. The optical film according to claim 4,
wherein an angle formed by a slow axis of the second phase difference layer and an absorption axis of the absorptive polarizer is 30° to 60°.

6. The optical film according to claim 1,
wherein at least a circular polarization reflection layer that can reflect light in a red wavelength range, a circular polarization reflection layer that can reflect light in a green wavelength range, and a circular polarization reflection layer that can reflect light in a blue wavelength range are included as the circular polarization reflection layers.

7. The optical film according to claim 1,
wherein at least a circular polarization reflection layer that can reflect light in a red wavelength range and a circular polarization reflection layer that can reflect light in green and blue wavelength ranges are included as the circular polarization reflection layers.

8. The optical film according to claim 1,
wherein the circular polarization reflection layer is a circular polarization reflection layer obtained by fixing cholesteric alignment of a rod-like liquid crystal compound.

9. The optical film according to claim 1,
wherein center wavelengths of reflection bands of the circular polarization reflection layers arranged on both sides of the first phase difference layer are different from each other by 30 nm or greater.

10. An illumination device comprising:
a light source; and
the optical film according to claim 1.

11. The illumination device according to claim 10, further comprising:
a reflection member that is arranged on a side of the light source opposite to the optical film and that converts a polarization state of light that is emitted from the light source and is reflected on the optical film and reflects the light.

12. The illumination device according to claim 10, wherein the light source emits blue light, green light, and red light.

13. An image display device comprising:
the optical film according to claim 1.

14. The image display device according to claim 13, further comprising:
liquid crystal cells.

15. The optical film according to claim 1, wherein retardation Re of the first phase difference layer in an in-plane direction is 0 to 30 nm.

* * * * *